United States Patent
Crisan et al.

(10) Patent No.: US 9,530,172 B2
(45) Date of Patent: Dec. 27, 2016

(54) ENCODING HIDDEN INFORMATION IN SPATIAL LINE FREQUENCIES

(75) Inventors: Silviu Crisan, Gatineau (CA); Marc Gaudreau, Ottawa (CA); Tadeusz Rygas, Ottawa (CA)

(73) Assignee: Canadian Bank Note Company, Limited, Ottawa (CA)

( * ) Notice: Subject to any disclaimer, the term of this patent is extended or adjusted under 35 U.S.C. 154(b) by 0 days.

(21) Appl. No.: 14/129,126

(22) PCT Filed: Jun. 27, 2011

(86) PCT No.: PCT/CA2011/050390
§ 371 (c)(1),
(2), (4) Date: Jan. 3, 2014

(87) PCT Pub. No.: WO2013/000057
PCT Pub. Date: Jan. 3, 2013

(65) Prior Publication Data
US 2014/0126766 A1     May 8, 2014

(51) Int. Cl.
G06K 9/00     (2006.01)
G06T 1/00     (2006.01)
G09C 5/00     (2006.01)

(52) U.S. Cl.
CPC ............. G06T 1/005 (2013.01); G06T 1/0028 (2013.01); G09C 5/00 (2013.01); *G06T 2201/0051* (2013.01)

(58) Field of Classification Search
None
See application file for complete search history.

(56) References Cited

U.S. PATENT DOCUMENTS 6,104,812 A * 8/2000 Koltai ................. G06T 1/0021
                                                       283/113
6,212,285 B1 * 4/2001 Bender ................ G06T 1/0028
                                                       380/54

(Continued)

FOREIGN PATENT DOCUMENTS

EP     0 490 457 A1       6/1992
EP     1018833 A2 *       7/2000    ........... G06T 1/0028

(Continued)

OTHER PUBLICATIONS

International Search Report issued in PCT/CA2011/050390 on Feb. 24, 2012 (12 pages).

(Continued)

*Primary Examiner* — Chan Park
*Assistant Examiner* — Iman K Kholdebarin
(74) *Attorney, Agent, or Firm* — Dicke, Billig & Czaja, PLLC

(57) ABSTRACT

A method of encoding a hidden image in high frequency spatial frequencies of a line pattern of a host image. A set of host image spatial frequencies is generated based on a predefined mapping of a domain of a set of representative scalar values of the hidden image and a domain of the host image spatial frequencies. The line pattern of the host image is generated based on the set of host image spatial frequencies. The host image may be composed of tiles containing parallel line segments, with each tile encoding a corresponding one of the scalar values. The host image may be composed of a stochastic line pattern generated from a white noise image convolved with a space variable kernel based on the predefined domain mapping. The hidden image may be decoded algorithmically or optically in a single step.

27 Claims, 31 Drawing Sheets

(56) References Cited

U.S. PATENT DOCUMENTS

| | | | | |
|---|---|---|---|---|
| 6,226,387 B1* | 5/2001 | Tewfik | | G06T 1/0028 375/E7.04 |
| 7,113,615 B2* | 9/2006 | Rhoads | | H04N 1/00846 382/100 |
| 7,461,255 B2* | 12/2008 | Iwamura | | G06T 1/0028 283/113 |
| 8,240,797 B2* | 8/2012 | Haas | | B41J 2/08 347/14 |
| 8,682,025 B2* | 3/2014 | Cvetkovic | | G09C 5/00 382/100 |
| 2002/0090112 A1* | 7/2002 | Reed | | G06F 17/30876 382/100 |
| 2004/0181671 A1* | 9/2004 | Brundage | | G07D 7/002 713/176 |
| 2004/0263911 A1* | 12/2004 | Rodriguez | | B42D 25/29 358/3.28 |
| 2005/0188205 A1* | 8/2005 | Alasia | | G06T 1/005 713/176 |
| 2005/0237577 A1* | 10/2005 | Alasia | | G06T 1/005 358/3.28 |
| 2006/0029278 A1* | 2/2006 | Alasia | | G06T 1/0071 382/232 |
| 2006/0034483 A1* | 2/2006 | Au | | G06T 1/0028 382/100 |
| 2006/0140442 A1* | 6/2006 | ElRayess | | G06T 1/0028 382/100 |
| 2006/0290136 A1* | 12/2006 | Alasia | | G07D 7/128 283/72 |
| 2007/0140524 A1* | 6/2007 | Kumar | | H04N 1/32154 382/100 |
| 2007/0217612 A1* | 9/2007 | So | | H04K 1/00 380/277 |
| 2008/0130883 A1* | 6/2008 | Agaian | | G06T 1/0028 380/54 |
| 2008/0205698 A1* | 8/2008 | Kunieda | | G06T 1/0071 382/100 |
| 2010/0322467 A1* | 12/2010 | Reed | | G06T 1/005 382/100 |
| 2011/0044494 A1* | 2/2011 | Bradley | | G06T 1/0064 382/100 |
| 2012/0087538 A1* | 4/2012 | Cvetkovic | | G09C 5/00 382/100 |
| 2012/0275641 A1* | 11/2012 | Al-Omari | | G06T 1/0071 382/100 |
| 2014/0355069 A1* | 12/2014 | Caton | | H04N 1/0087 358/3.28 |

FOREIGN PATENT DOCUMENTS

| | | | | |
|---|---|---|---|---|
| EP | 1018833 | A2 | 12/2000 | |
| EP | 1 048 168 | B1 | 7/2003 | |
| EP | 1345193 | A2 * | 9/2003 | G06T 1/0021 |
| JP | 2000216991 | A * | 8/2000 | |

OTHER PUBLICATIONS

Li, Youzhi et al. Security and encryption optical systems based on a correlator with significant output images. Applied Optics, vol. 39, No. 29 (Oct. 10, 2000), Optical Society of America, pp. 5295-5301. XP000981154.

Van Renesse, Rudolf L. "Optical Document Security, Screen-decoded Images" in Optical Document Security/Third Edition; [Artech House Optoelectronics Library] (Artech House, Boston/London, Jan. 1, 2005), pp. 146-169. XP002554525.

Extended European Search Report mailed Jun. 16, 2015 for EP 11868845.6.

* cited by examiner

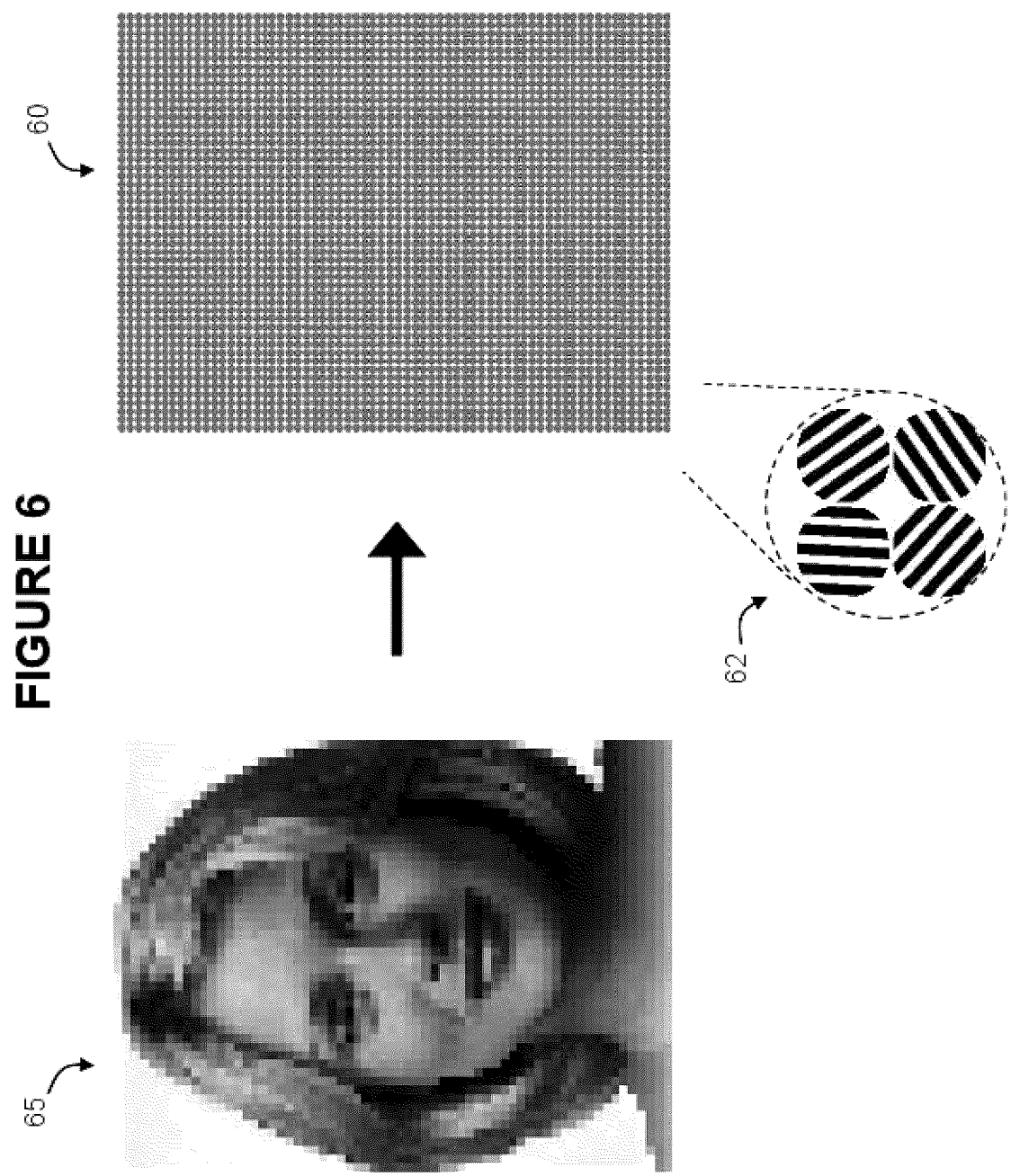

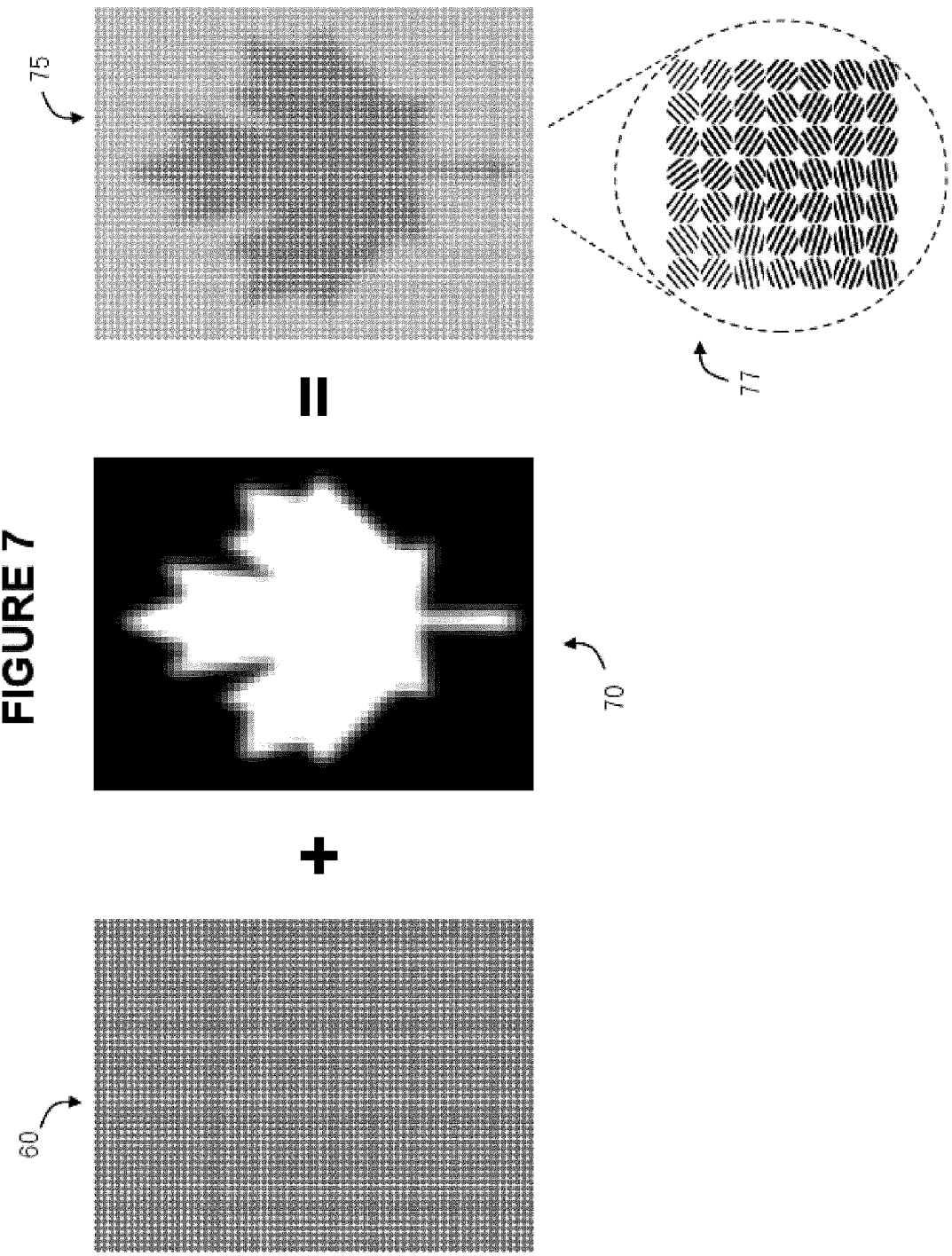

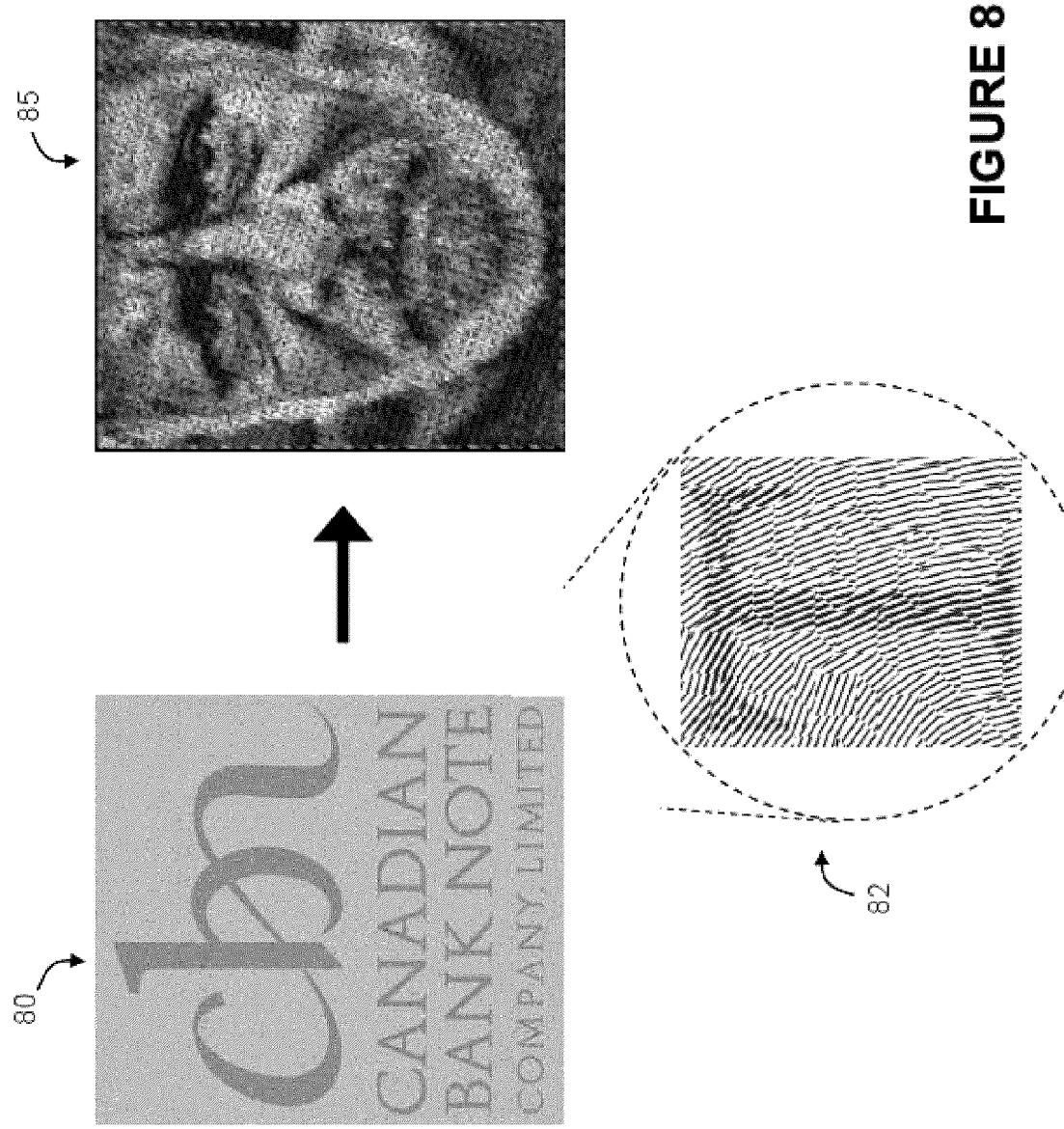

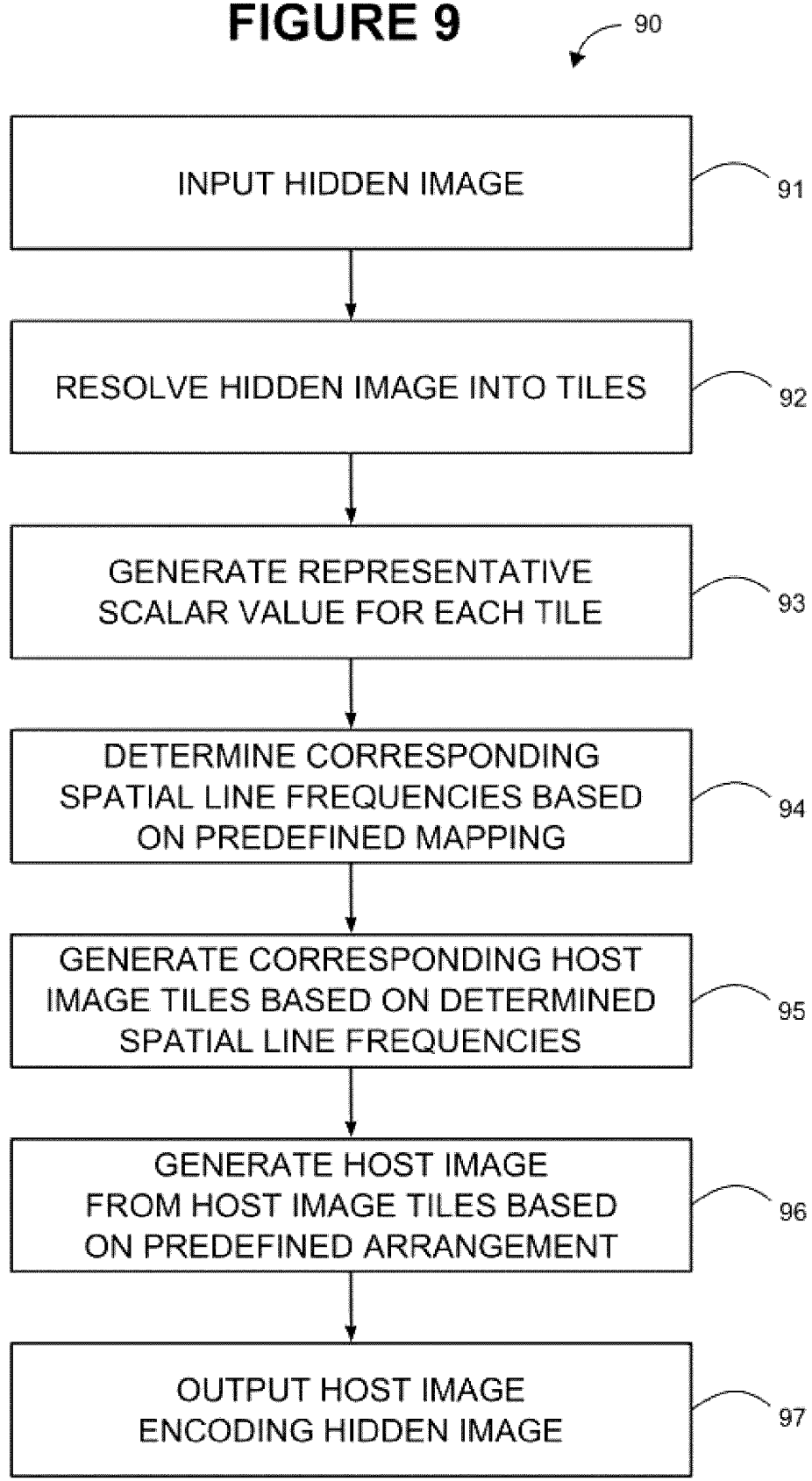

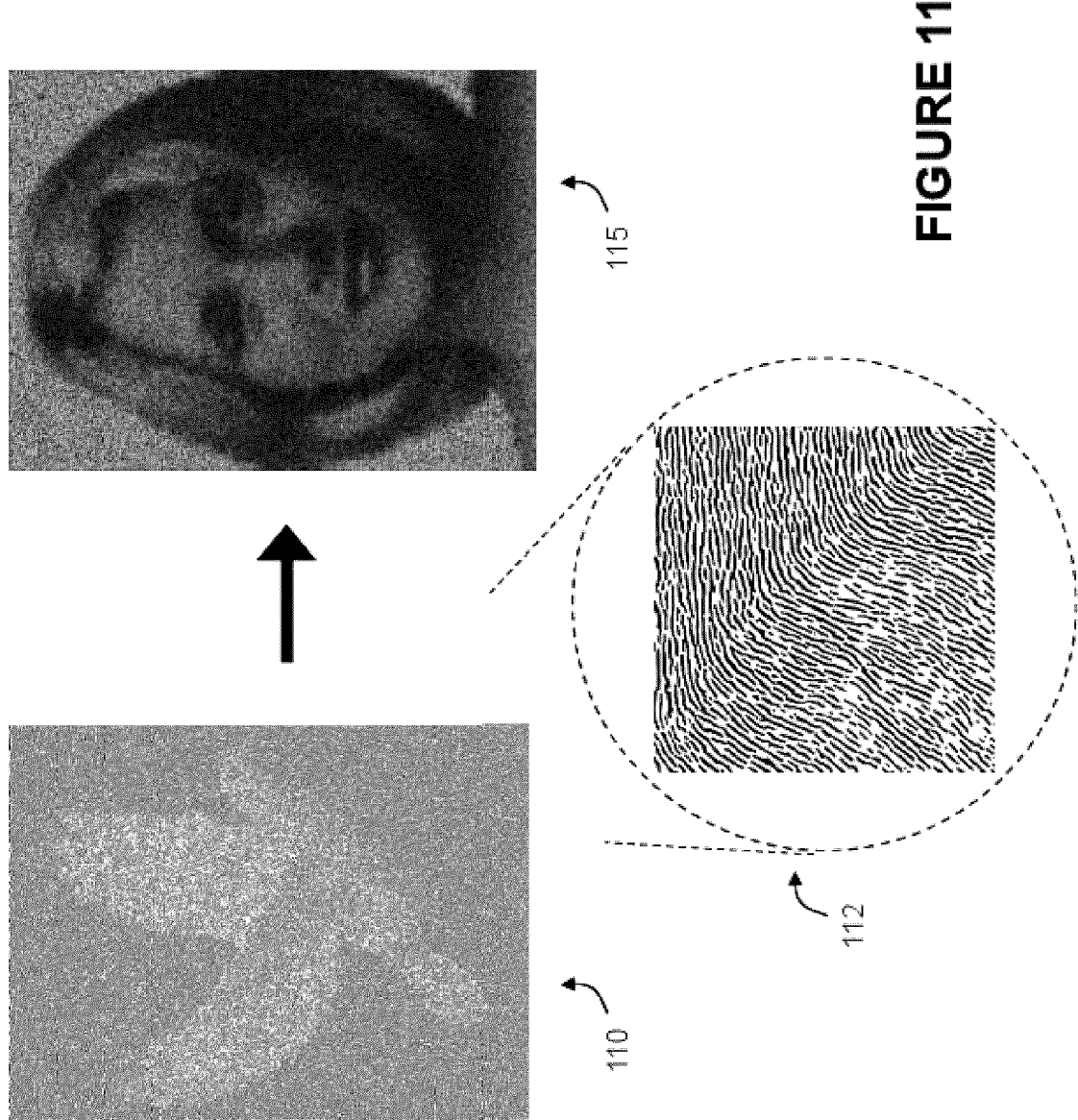

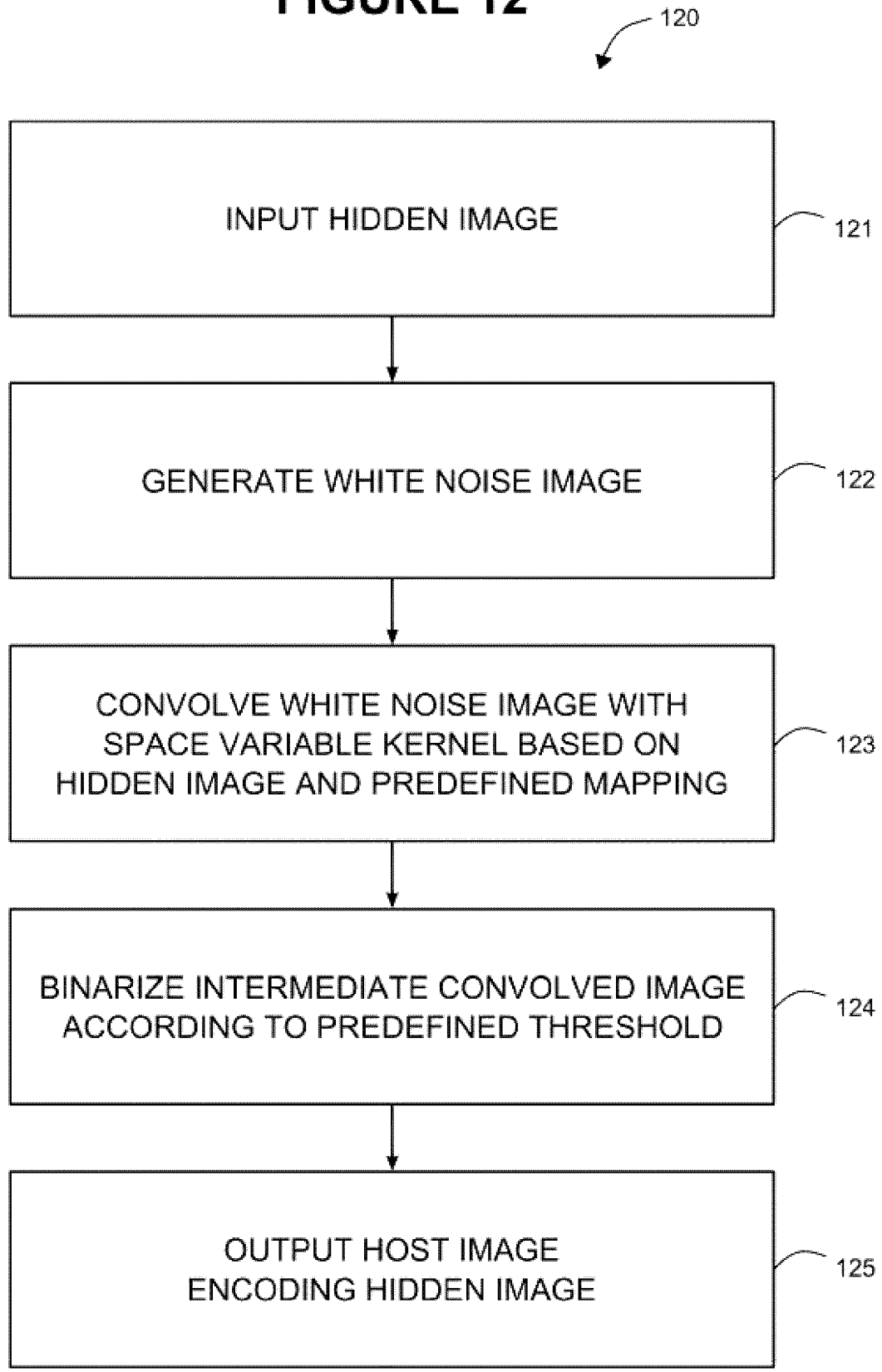

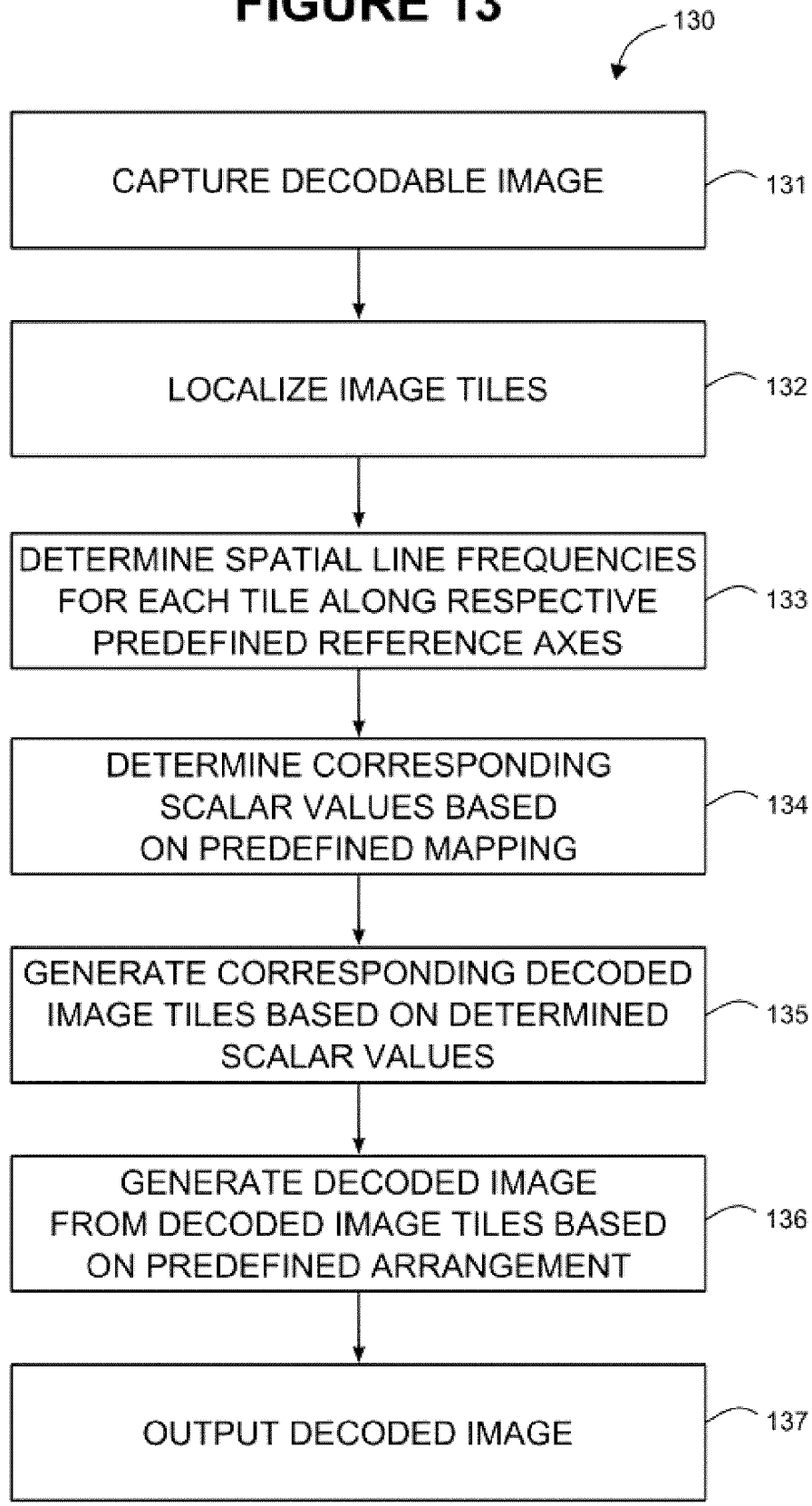

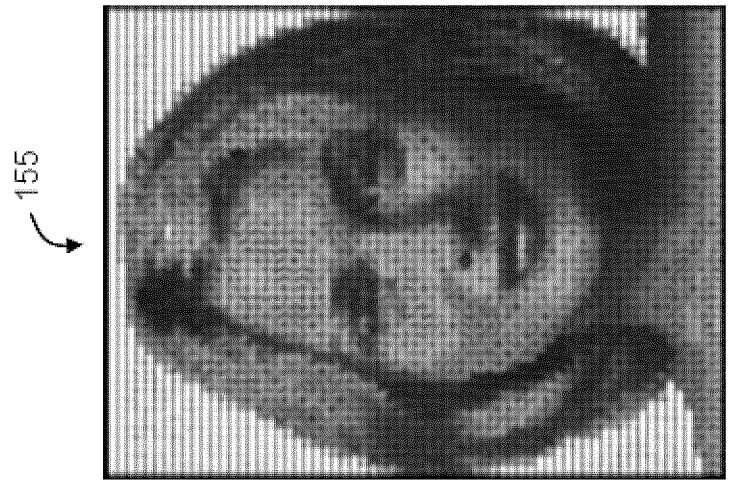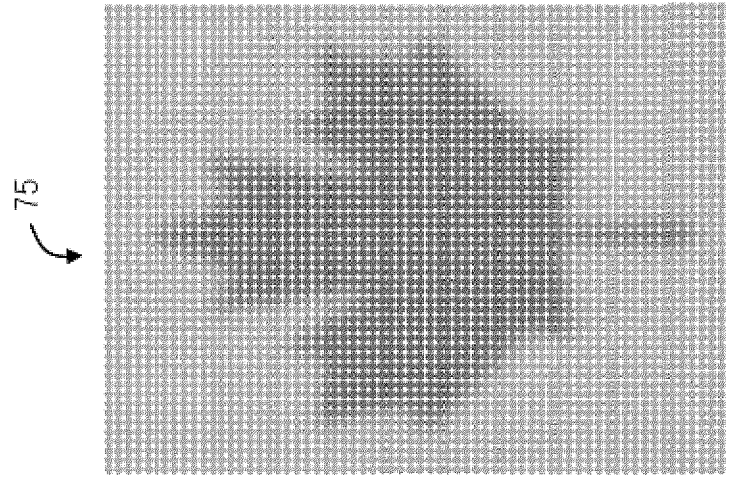
FIGURE 15

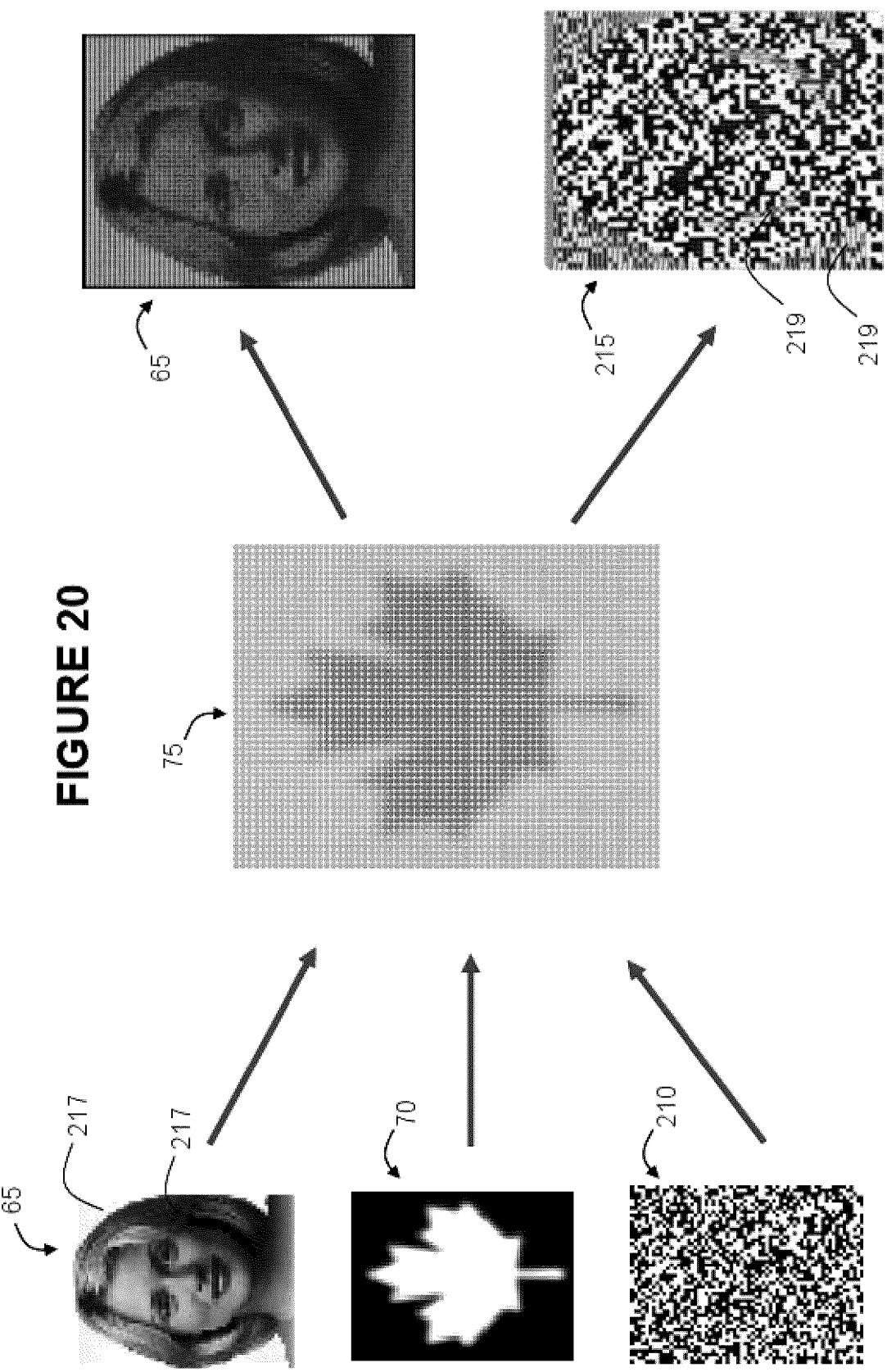

ENCODING HIDDEN INFORMATION IN SPATIAL LINE FREQUENCIES

COPYRIGHT NOTICE

A portion of the disclosure of this patent document contains material that is subject to copyrights. The copyright owner has no objection to the facsimile reproduction by anyone of the patent document or the patent disclosure, but otherwise reserves all copyrights whatsoever.

BACKGROUND OF THE INVENTION

Field of the Invention

The invention relates generally to secure documents and more particularly to systems and methods for encoding information therein.

Description of the Related Art

Watermarking is a technique well-known in the art of secure documents which derive their value substantially from the ability of users to rely confidently upon their authenticity and, in this connection, their resistance to counterfeiting. Examples of such documents include tangible documents such as banknotes, passports, driver's licenses, identification cards, and lottery tickets, and also intangible documents such as electronic documents.

Watermarking may be employed in steganography by incorporating into documents hidden information which is both unintelligible to an observer and whose presence in the document is not apparent absent knowledge of the means of its incorporation. A common method of this type is the inclusion in a secure document of a host image, e.g. a picture of a famous landmark, or a portrait of a notable person, which is itself readily perceivable by an observer, but within which a hidden image is encoded and is neither perceivable by an observer nor whose presence is either indicated or suggested by the host image or any other aspect of the document. The intention of such methods is that nothing in the document leads anyone apart from the document producer and the document authenticator to suspect the presence of hidden content, thereby rendering the document less susceptible to attempted counterfeiting or infiltration.

With the advent of electronic commerce, secure documents now take digital form in addition to the traditional, tangible form of banknotes and the like, and so digital watermarking is now widely practiced. Moreover, the production of tangible secure documents now typically proceeds by first developing a digital image of the document which is then used to produce a tangible document using known printing methods. The effective use of digital watermarking in the production of tangible secure documents depends in part, however, on the specific printing method employed, and in particular any limitations associated with that printing method. Unless such limitations are taken into account, it is possible that any hidden information, such as a digital watermark, encoded in a digital image used to produce the tangible document may be undesirably altered when printed and thereby rendered ineffective as a security feature.

In this connection, it is noted that, with the notable exception of laser marking and dye diffusion printing, both analog and digital printing methods involve the deposit of a pigment on a substrate without controlling the obtained optical density within the points or the lines defining the printed graphic. The perception by the unaided eye of a shade of grey in a zone perceived as a geometric point is typically achieved by controlling the proportion of that area covered by the pigment. This type of printing is often called 'binary halftoning'. The common use of binary halftoning, however, presents problems when used to incorporate a digital watermark as a hidden image in a host image. Specifically, the translation of digital steganography in the field of binary halftone printing becomes difficult as the range of grey values reduces to two, i.e. the absence of or the presence of a point of impression. There exist at least two known methods of addressing this limitation.

In a first method, as exemplified in WIPO International Publication No. WO 99/53428 by Digimark Corporation [the "Digimark method"], a coarse partition is defined which is significantly larger than the printing points used in the impression associated with the definition domain of the host image. The mean value of the host image field is computed for each coarse partition subset, or constituent region, and these mean values become the entry values in a matrix associated with the original image. Digital watermarking algorithms are then applied to this coarse partition matrix which allows real valued entries instead of only binary values. The process of incorporating the watermark into the host image involves the slight thickening, thinning, or deviation of the lines or points contained within each constituent region in order to achieve a specific increase or decrease in the average optical density associated with that region. The result is an alteration of the average values of the original image in these regions, whereby the steganographic information is embedded. In general, this method is suitable for artwork texture having an almost uniform average optical density.

In a second method, as exemplified in U.S. Pat. No. 5,315,098 to Tow [the "Tow" method], the unique, uncontrolled impression point shapes typically employed in binary halftoning are replaced with a predetermined number of specific shapes each having a predetermined angular anisotropy, e.g. ellipses, wherein the rotation of the major axis of any such ellipse with reference to a predetermined reference axis may be selected within certain limits whereby a predetermined number of angular ranges may be discriminated. By this technique, the informational space associated with the basic element of binary printing may be broadened. A binary halftone image may be represented using such anisotropic points wherein a finite number N (e.g. two) of different specific angular ranges are permitted. Detection of the anisotropic points of any particular range may be performed by linear filtering with N such convolution operations being necessary.

The two above-described methods may be distinguished by a comparison of the initial resolution of the host image and the effective resolution of the watermark. In the first method, the digital watermark information manifests at a resolution significantly coarser than the original host image. This method may be characterized as encoding in the low frequency region of the Fourier spectrum associated with the host image. The inconspicuous character of the watermark is achieved by altering the average values of the optical reflectance of the partition subsets within the threshold of discrimination of human vision of grey levels. In the second method, the selective shaping of the impression points implies an increase of the host image effective resolution, but wherein again the spectral footprint of the anisotropic impression points remains confined around the origin of the spectral plane. In this case, the inconspicuous character of the watermark is achieved by the selective rotation of the anisotropic impression points outside of the angular limit of acuity of human vision.

While the above-described methods provide certain advantages for encoding hidden images in secure documents, they suffer from certain shortcomings.

The Digimark method, for example, relies substantially on precise control over the alteration in luminosity of any partition constituent region, and is vulnerable to unintended non-uniform changes in the luminosity of the host image. In other words, since the hidden information in the Digimark method is stored in very subtle variations in local luminosity, any unintended non-uniform changes in the luminosity of the host image would corrupt the hidden information, rendering the method unsuitable where robust storage of the hidden information is required. Moreover, since the Digimark method uses subtle variations in local luminosity to encode the hidden information, this technique is removed from other practical uses, e.g. to create in the host image a visible image by selectively altering the thickness of the constituent lines. The Digimark method therefore inefficiently employs for encoding of hidden information a property of the host image which is also useful for constructing a visible image.

In the Tow method, on the other hand, binary information is stored in the relative rotation of a plurality of binary halftone impression points which are purposefully anisotropic. Each such impression point is required to contain a bit of the hidden information. The method, therefore, relies substantially on a considerable degree of precision in both producing such anisotropic impression points, but also the detecting of their relative rotation during decoding, and is therefore highly sensitive to any artefact which might affect the produced or detected rotation of each impression point.

There remains, therefore, a need for novel and effective methods of encoding hidden images in security documents for combating counterfeiting and infiltration.

BRIEF SUMMARY OF THE INVENTION

The above-described advantages are provided by the embodiments described hereinafter.

A method of making a secure document including a host image encoding a hidden image comprises the following steps. The hidden image is input. A set of representative scalar values based on the hidden image is determined. A set of host image spatial frequencies corresponding to the set of representative scalar values is generated, wherein each host image spatial frequency is generated based on the corresponding representative scalar value and a predefined mapping of a domain of the set of representative scalar values and a domain of the host image spatial frequencies. The host image is generated based on the set of host image spatial frequencies, the host image comprising a line pattern characterized by the set of host image spatial frequencies. The host image is incorporated in the secure document.

Determining the set of representative scalar values may comprise the following steps. The hidden image may be resolved into a set of hidden image tiles corresponding to the set of representative scalar values, each hidden image tile containing a corresponding subset of the hidden image. For each hidden image tile, the corresponding representative scalar value may be determined based on the corresponding subset of the hidden image contained in the hidden image tile. Generating the host image may comprise the following steps. A set of host image tiles corresponding to the set of representative scalar values may be generated, each host image tile containing a corresponding subset of the line pattern characterized by the host image spatial frequency corresponding to the representative scalar value corresponding to the host image tile. The host image tiles may be assembled according to a predefined arrangement.

The hidden image may be a greyscale image, and, for each hidden image tile, determining the corresponding representative scalar value based on the corresponding subset of the hidden image contained in the hidden image tile may comprise determining a representative greyscale value of the subset of the greyscale image contained in the hidden image tile.

The set of host image tiles may comprises a plurality of circles or a plurality of edge-sharing polygons.

For each host image tile, the subset of the line pattern contained in the host image tile may comprise a set of spaced parallel line segments, wherein a spatial frequency of the set of line segments is characterized by the corresponding host image spatial frequency.

The line pattern may comprise a plurality of line segments, and the method may further comprise incorporating a visible image into the host image, wherein a thickness of each of selected ones of the line segments is selectively increased or decreased.

Determining the set of representative scalar values may comprise determining each representative scalar value at a corresponding point in the hidden image. Generating the host image may comprise the following steps. A white noise image may be generated, wherein, for each of a plurality of points in the white noise image, a value of the white noise image is generated at least in part based on a probabilistic variable. An intermediate image may be generated based on a convolution of the white noise image with a space variable kernel, wherein, for each specified point in a plane of the intermediate image, a value of the space variable kernel is based on: a decay function characterized in that a value of the decay function decreases with distance from the specified point; and a periodic function characterized in that a value of the periodic function varies periodically with distance from the specified point and is dependent upon the host image spatial frequency corresponding to the representative scalar value determined for a corresponding point in the hidden image. The intermediate function may be binarized according to a predefined threshold value, thereby generating the host image.

The hidden image may be a greyscale image, and each representative scalar value may be determined based on a greyscale value of the greyscale image at the corresponding point in the greyscale image.

The space variable kernel may be determined based on formula (1), as discussed below.

A visible image may be incorporated into the host image, wherein a thickness of selected graphical elements of the host image are selectively increased or decreased.

The hidden image may be a first hidden image, the set of representative scalar values may be a set of first representative scalar values, the set of host image spatial frequencies may be a set of first host image spatial frequencies, and the predefined mapping may be a first predefined mapping, and the method may comprise these further steps. A second hidden image may be input. A set of second representative scalar values may be determined based on the second hidden image. A set of second host image spatial frequencies corresponding to the set of second representative scalar values may be generated, wherein each second host image spatial frequency is generated based on the corresponding second representative scalar value and a second predefined mapping of a domain of the set of second representative scalar values and a domain of the set of second host image spatial frequencies, wherein the domain of the set of first host image spatial frequencies and the domain of the set of second host image spatial frequencies are non-overlapping. The host image may be generated based further on the set of second host image spatial frequencies.

The hidden image may be a first hidden image, the domain of the host image spatial frequencies may comprise non-overlapping first and second sub-domains, and the predefined mapping may map the domain of the set of representative scalar values redundantly to the first and second sub-domains, and the method may comprise these further step. A second hidden image may be input. A set of representative binary values may be determined based on the second hidden image, the set of representative binary values corresponding to the set of representative scalar values. Each host image spatial frequency may be generated based on the predefined mapping to only the first sub-domain or only the second sub-domain based on the corresponding representative binary value.

A first sub-set of the line pattern may be generated based on a first subset of the host image spatial frequencies based on the predefined mapping to the first sub-domain. A second sub-set of the line pattern may be generated based on a second subset of the host image spatial frequencies based on the predefined mapping to the second sub-domain. Each host image spatial frequency may comprise a spatial frequency vector comprising a spatial frequency direction. The spatial frequency direction of each of the host image spatial frequencies based on the predefined mapping to the first sub-domain may be within a first domain of spatial frequency directions. The spatial frequency direction of each of the host image spatial frequencies based on the predefined mapping to the second sub-domain may be within a second domain of spatial frequency directions. The first domain of spatial frequency directions may be non-overlapping with the second domain of spatial frequency directions.

Incorporating the host image in the secure document may comprise printing the host image on a substrate of the secure document using a first ink imageable under a first illumination spectrum, wherein the first ink is also imageable under a second illumination spectrum non-overlapping with the first illumination spectrum. The method may comprise these further steps. A noise screen may be printed on the substrate of the secure document in overlapping relation to the host image using a second ink imageable under the second illumination spectrum. The host image may be imageable separately from the noise screen under the first illumination spectrum, and may be imageable only in combination with the noise screen under the second illumination spectrum.

Graphical elements of the noise screen may be characterized by spatial frequencies falling within the domain of the host image spatial frequencies.

The host image may comprise a first host image and a second host image, the first host image comprising a first subset of the line pattern, the second host image comprising a second subset of the line pattern. The first subset of the line pattern may be characterized by the set of first host image spatial line frequencies. The second subset of the line pattern may be characterized by the set of second host image spatial line frequencies. Incorporating the host image in the secure document may comprise the following steps. The first host image may be printed on a substrate of the secure document using a first ink imageable under a first illumination spectrum, wherein the first ink is also imageable under a second illumination spectrum non-overlapping with the first illumination spectrum. The second host image may be printed on the substrate of the secure document using a second ink imageable under the second illumination spectrum, wherein the second ink is also imageable under a third illumination spectrum non-overlapping with the first and second illumination spectrums. The first host image is imageable separately from the second host image under only the first illumination spectrum, and the second host image is imageable separately from the first host image under only the third illumination spectrum.

The line pattern may comprise a plurality of line segments including a first set of line segments and a second set of line segments. Incorporating the host image in the secure document may comprise the following steps. The first set of line segments may be printed on a substrate of the secure document using a first ink imageable under a first illumination spectrum, wherein the first ink is also imageable under a second illumination spectrum non-overlapping with the first illumination spectrum. The second set of line segments may be printed on the substrate of the secure document using a second ink, wherein the second ink is imageable under only the second illumination spectrum, or wherein the second ink is image under only the second illumination spectrum and a third illumination spectrum non-overlapping with the first and second illumination spectrums. The first and second sets of line segments of the line pattern of the host image are imageable together under only the second illumination spectrum.

The first set of line segments may be interleaved with the second set of line segments.

An apparatus for making a secure document including a host image encoding a hidden image may comprise processing circuitry and a memory configured to perform any of the above methods.

A method of generating a decoded image from a host image comprising a periodic line pattern encoding a hidden image may comprise the following steps. The host image may be input. A frequency domain representation of a decoding filter may be generated, wherein a value of the decoding filter at any specified point in the frequency domain is based on a predefined mapping of a domain of a set of representative scalar values of the decoded image and a domain of host image spatial frequencies of the host image. The set of representative scalar values may be generated the host image spatial frequencies and the decoding filter. The decoded image may be generated based on the set of representative scalar values. The decoded image may be output.

The method may further comprise generating a frequency domain representation of the host image, and generating the set of representative scalar values may comprise the following steps. A filtered image may be generated based on an entrywise product of the frequency domain representation of the host image and the frequency domain representation of the decoding filter. A spatial domain representation of the filtered image may be generated, the spatial domain representation comprising the set of representative scalar values. The frequency domain representation of the host image may comprise a Fourier transform of the host image, and the spatial domain representation of the filtered image may comprise an inverse Fourier transform of the filtered image.

The method may also further comprise generating a spatial domain representation of the decoding filter corresponding to the frequency domain representation of the decoding filter, and generating the set of representative scalar values may comprise generating a filtered image based on a convolution of a spatial domain representation of the host image and the spatial domain representation of the decoding filter, wherein the filtered image comprises the set of representative scalar values.

The method may further comprise displaying the decoded image.

An apparatus for generating a decoded image from a host image comprising a periodic line pattern encoding a hidden image may comprise processing circuitry and a memory configured to perform any of the above methods.

The apparatus may further comprise an imager for capturing the host image from a secure document.

The apparatus may further comprise a display for displaying the decoded image.

A method of generating a decoded image from a host image comprising a periodic line pattern encoding a hidden image may comprise the following steps. The host image may be provided on a transparent medium, wherein the periodic line pattern produces a transparency modulation in the transparent medium. The transparent medium may be illuminated with collimated monochromatic coherent light at normal incidence so as to transfer linearly the transparency modulation onto a light field amplitude of the light, thereby producing a modified light field. The modified light field may be passed through a lens system comprising an aperture based on a frequency domain representation of a decoding kernel based on a predefined mapping of a domain of representative scalar values of the hidden image and a domain of host image spatial frequencies, thereby producing a further modified light field. An image plane may be illuminated with the further modified light field, thereby generating the decoded image.

The method may use an optical 4f correlator comprising the lens system, the image plane, and a source of the collimated monochromatic coherent light.

BRIEF DESCRIPTION OF THE DRAWINGS

An understanding of the exemplary embodiments will be obtained from the following description, with reference to the following drawings in which:

FIG. 6 shows a greyscale hidden image of a portrait of a woman's face and a host image comprising circular tiles encoding the greyscale hidden image, as well as a detail view of a portion of the host image.

FIG. 7 shows the host image of FIG. 6, a visible image of a maple leaf, and the host image of FIG. 6 modified so as to incorporate the visible image, as well as a detail view of a portion of the host image containing the visible image.

FIG. 8 shows a host image comprising edge-sharing polygons encoding a hidden image and containing a visible image of a logo, and a decoded image based on the hidden image of a greyscale portrait of a man's face, as well as a detail view of a portion of the host image.

FIG. 9 shows a flowchart illustrating a method of generating a host image encoding a hidden image wherein the host image comprises tiles.

FIG. 11 shows a host image comprising a stochastic line pattern encoding a hidden image and containing a visible image of a bird, and a decoded image based on the hidden image of a greyscale portrait of a woman's face, as well as a detail view of a portion of the host image.

FIG. 12 shows a flowchart illustrating a method of generating a host image encoding a hidden image wherein the host image comprises a stochastic line pattern.

FIG. 13 shows a flowchart illustrating a method of generating a decoded image from a decodable image captured from a host image comprising tiles.

FIG. 15 shows a decodable image capture from a host image comprising circular tiles and containing a visible image of a maple leaf, and a decoded image of a hidden image encoded therein of a greyscale portrait of a woman's face.

FIG. 20 shows a host image comprising circular tiles encoding therein a hidden greyscale image of a portrait of a woman's face and a hidden binary image, and further containing a visible image of a maple leaf, along with the hidden greyscale image, the visible image, and the hidden binary image, and as a decoded images generated from the host image of the hidden greyscale image and the hidden binary image.

Where appropriate, the same reference numerals are used in the drawings to indicate like features in all of the drawings.

DETAILED DESCRIPTION OF EXEMPLARY EMBODIMENTS OF THE INVENTION

Reference will now be made to embodiments of the invention. While the invention is described by way of such embodiments, it is understood that the description is not intended to limit the invention to such embodiments, but is intended to cover alternatives, equivalents, and modifications which may be broader than the embodiments, but which are included within the scope of the appended claims.

In an effort to prevent obscuring the invention at hand, only details germane to implementing the invention will be described in great detail, since it is appreciated that peripheral details will be presently understood by persons skilled in the art.

The present inventors have discovered that the disadvantages described above may be overcome by encoding hidden information in a host image of a secure document, and particularly in the spatial frequencies of high frequency spatial features of the host image. Such encoding does not generally rely upon any measurement of the optical density or luminosity of the host image, which therefore remains available for the incorporation of a visible image into the host image, thereby providing a steganographic feature. By employing the spatial frequencies of high frequency spatial features of the host image, which does not rely upon precise control over the individual elements thereof, the inventors' solution avoids the shortcomings of such reliance and benefits instead from the known robustness of frequency encoding of information.

Embodiments of the present invention contemplate a secure document including a host image encoding hidden information, wherein the hidden information may be a hidden image. The host image may also have superimposed therein a visible image, thereby diverting a viewer's contemplation away from the possibility of the presence of hidden information. The host image may be an analog (continuous) image or a digital image of sufficiently high resolution. The secure document may be a tangible document such as a banknote, a passport, a driver's license, an identification card, or a lottery ticket, or an intangible document such as an electronic document.

Figure 1:
FIG. 1 shows a microline line texture as known in the art.

The host image may be composed of a periodic line texture—i.e. a pattern of lines having generally a uniform spacing and initially a uniform thickness—which may be a microline texture as is commonly used in the production of secure documents such as banknotes and passports. A magnified portion of a secure document—specifically, a banknote—containing an exemplary periodic line structure is shown in FIG. 1. The line texture has a high spatial frequency and has initially a uniform average optical density. The thickness of the lines composing the line pattern and the spatial frequency of the lines are such that the local structure of the line pattern is invisible to the unaided eye which, being unable to resolve such local structure, instead perceives a continuous shade. For example, reliable lithographic methods are known for printing lines having a 25 μm width on paper substrates, and half this width on plastic substrates. By comparison, it is known that the human visual acuity is limited to a black-white dot sequence of approximately 75 μm. It is, thus, immediately apparent that periodic line textures may easily be produced beyond of the limits of unaided human acuity.

Figure 2:
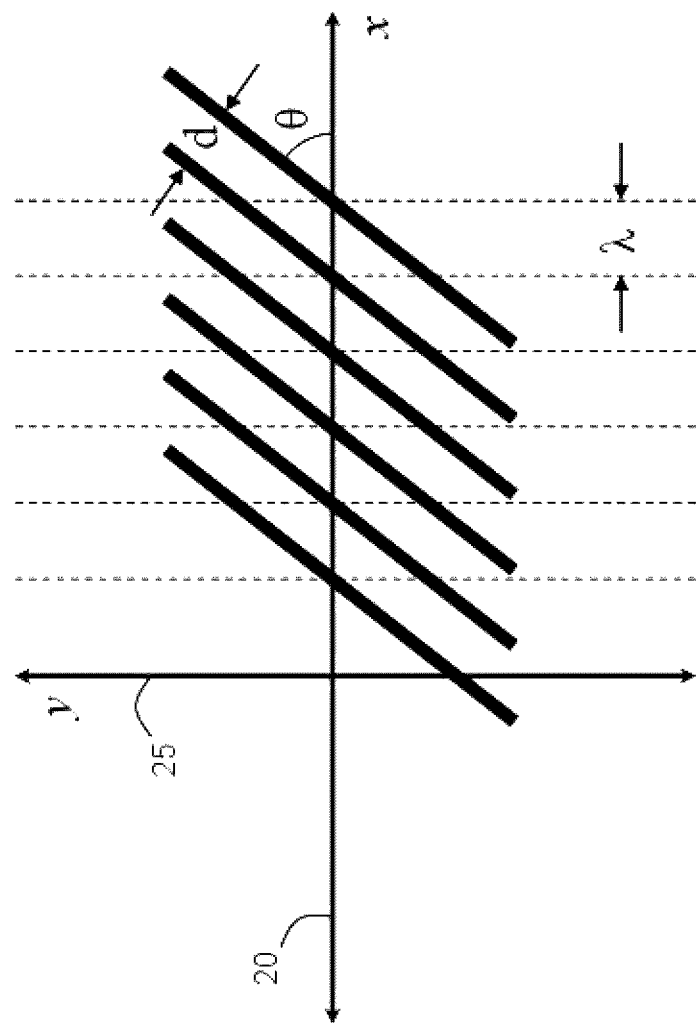
FIG. 2 shows a schematic representation of a relationship between an angular orientation of spaced parallel lines and a spatial line frequency along a predefined reference axis.

While any suitable high frequency spatial features of the periodic line texture may be used for the purpose of encoding hidden information, the inventors have discovered advantages in the use of a measure of the local spatial line frequency.

Where a host image contains a periodic line texture as described above—i.e. consisting of a plurality of generally uniformly spaced lines having generally uniform thickness—the angular orientation θ of the lines about a given location in the host image, with reference to a predetermined linear reference axis, will correspond to a spatial line frequency along that reference axis. This relationship is shown in FIG. 2, wherein the spatial line frequency, $f_x$, along the x-axis 20 is $f_x = 1/\lambda = \sin\theta/d$, where d is the local perpendicular line spacing, θ is their angular orientation relative to the x-axis, and λ is the line spacing along the x-axis.

Thus, in the special case of a host image having a periodic line texture with a fixed line spacing d throughout, a single spatial line frequency $f_x$ may be determined at any point with reference to a predetermined reference axis, i.e. the x-axis, and the spatial line frequency so determined will correspond to a respective spatial line frequency along any other reference axis, e.g. the spatial line frequency $f_y$ along the y-axis 25, by a known mathematical relationship.

Figure 3A:
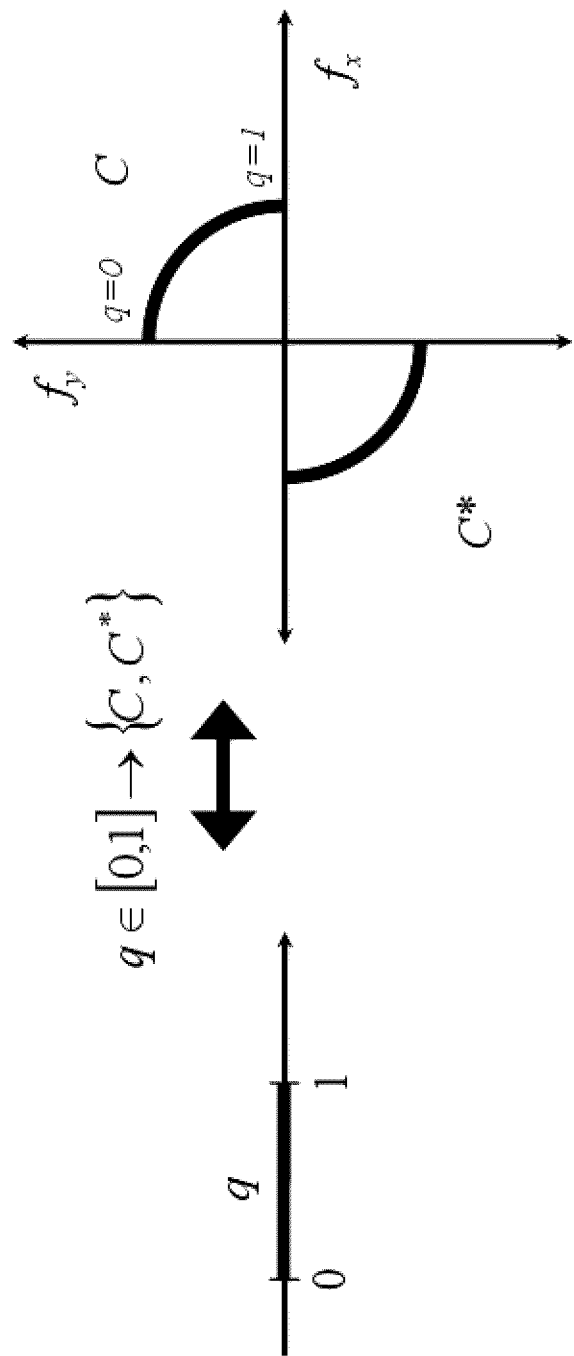
FIGS. 3A & 3B show schematic representations of mappings between a domain of a set of representative scalar values and a set of host image spatial line frequencies.
Figure 3B:
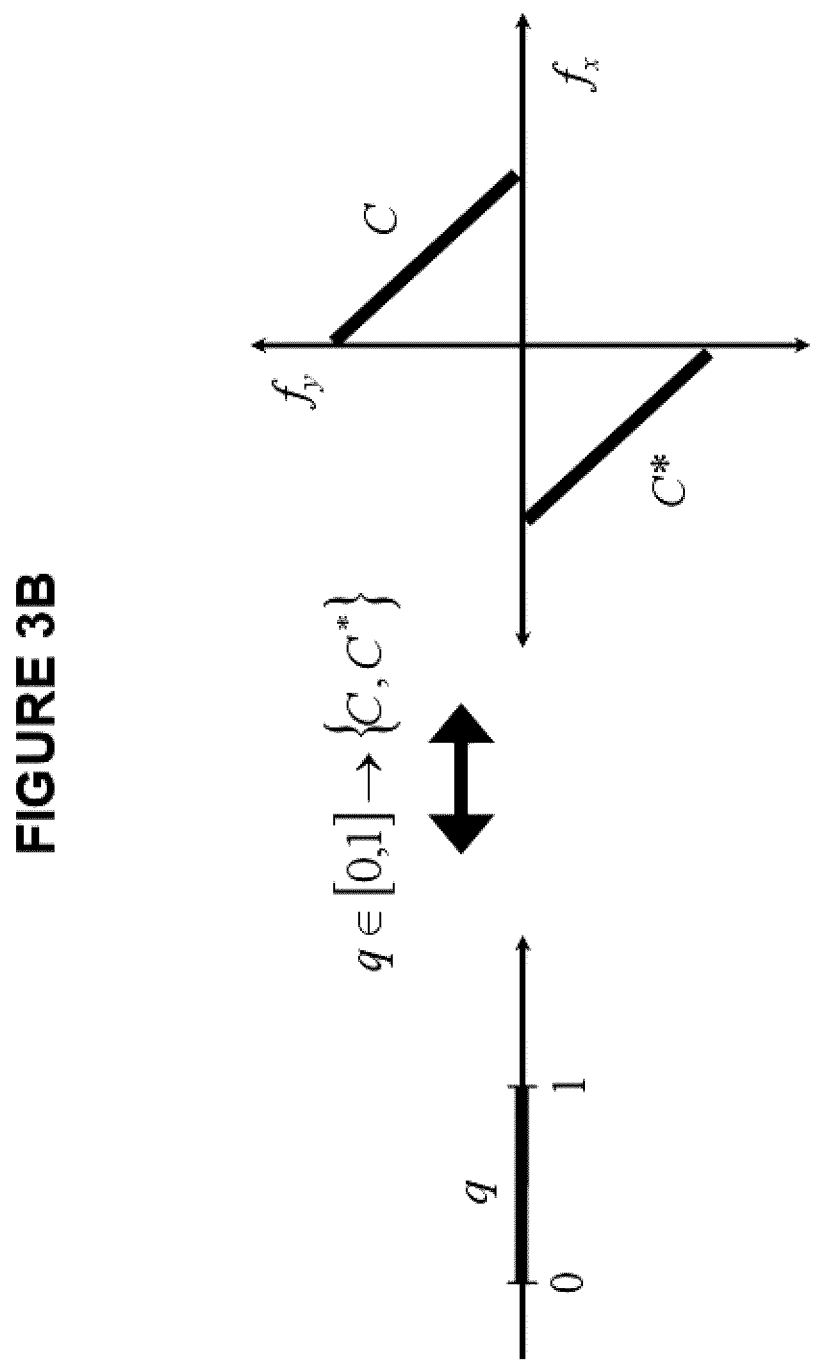

In a more general case, however, the restriction of having a fixed line spacing d throughout may be eliminated, in which case the spatial line frequencies along other dimensions are decoupled thereby enabling the definition of a more complex specification of the spatial line frequencies of the host image line pattern. In the embodiments hereinafter, for example, the spatial line frequencies of the host image in both dimensions of the Euclidean place of the host image, i.e. $f_x$ and $f_y$, are used wherein the scalar domain of the hidden information may be mapped in bijective association to the spatial line frequencies of the host image according to a predetermined mapping relationship. Exemplary mappings are shown in FIGS. 3A & 3B. Each mapping $q\in[0,1]\rightarrow\{C, C^*\}$ is between a domain q of the scalar values of the hidden information, in this case specified from 0 to 1, and a domain C (and its origin symmetric $C^*$) of the spatial line frequencies of the host image, in this case describing a circular segment in the frequency space of the host image, wherein $f_x$ represents the local line frequency of a given point in the spatial domain along a predefined x-axis, and $f_y$ similarly represents the line frequency along a predefined orthogonal y-axis.

In the exemplary mapping illustrated in FIG. 3A, the scalar value of 0 maps to the end of circular segment C on the vertical axis $f_y$, i.e. where $f_x=0$, i.e. where the lines in the spatial domain are horizontal. Similarly, the scalar value of 1 maps to the end of segment C on the horizontal axis $f_x$, i.e. where $f_y=0$, i.e. where the lines are vertical. Such a circular mapping corresponds generally to the special case described above wherein the scalar domain is mapped to a spatial line frequency with reference to a single linear reference axis, e.g. to $f_x$, and where the line spacing is held constant throughout the pattern (in which case $f_y$ could be calculated therefrom). It will be appreciated, however, that any segment C in the frequency space of the host image may be selected so long as a bijective association may be made with the scalar domain q of the hidden information. Accordingly, a further example is shown in FIG. 3B wherein the spatial line frequencies domain C is instead a straight line segment in the frequency space of the host image. In the embodiments described hereinafter, the circular mapping discussed above is used, though it will be understood that any convenient mapping may be used.

Thus, for the purposes of encoding information, the full range of line frequencies along the reference axis may be mapped to a corresponding range of scalar values constituting a domain of the hidden information. By this method, the hidden information may be encoded in the host image by constructing the host image so as to have in each of a predetermined plurality of points or constituent areas, as the case may be, a spatial line frequency based on the corresponding encoded scalar values of the hidden information.

Figure 4:
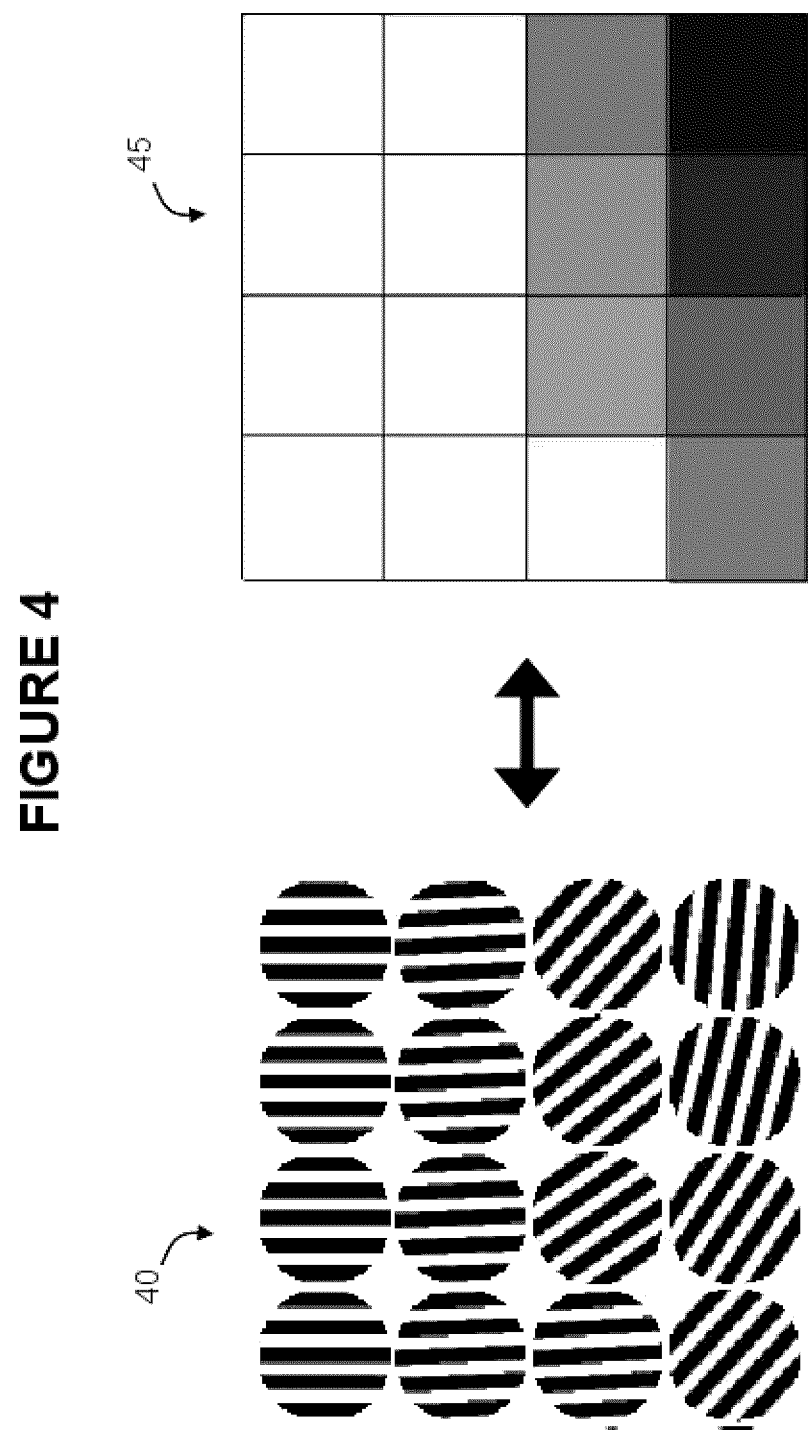
FIG. 4 shows a host image of circular tiles containing spaced parallel line segments encoding in the spatial line frequencies thereof the greyscale values of corresponding greyscale tiles.

In particular, where the hidden information is a hidden image, and in particular a greyscale image, the scalar values encoded by the spatial line frequencies of the host image may represent greyscale levels, graphically reproducible as shades of grey, and the mapping would therefore bijectively relate the spatial line frequencies to the greyscale levels. FIG. 4 illustrates such a mapping by showing a plurality of circular tiles 40 each containing a plurality of parallel line segments, the line segments defining spatial line frequencies in the vertical and horizontal axes, i.e. $f_x$ and $f_y$. A corresponding plurality of greyscale blocks 45 is also shown, and each such greyscale block corresponds exclusively to a respective one of the circular tiles having the same relative position as that greyscale block (e.g. the upper-left-most corner tile corresponds to the upper-left-most corner greyscale block). A greyscale value of each such block representative of the shade of grey shown is encoded in the line frequencies of the corresponding circular tile.

Such a mapping may be defined so as to relate the spatial line frequencies discussed herein to any desired scalar values constituting hidden information. For example, the hidden information may be non-graphical information, wherein the mapping relates spatial line frequencies to corresponding real numbers. As described above, these real numbers may be interpretable as graphical information, e.g. as greyscale values. As illustrated hereinafter, the mapping may also enable the encoding of a graphical image incorporating multiple channels, e.g. an RGB, CMYK, or other chroma-luma encoded colour image. In such case, the separate components of each individual pixel of the hidden image may be encoded separately in different constituent regions or locations of the host image, or alternatively the scalar domain may be divided into multiple channels (e.g. where the full range of line frequencies is divided into a number of sub-ranges, with each sub-range further subdivided and separately mapped to scalar values of each of the multiple channels).

While not necessary for the purposes of encoding the hidden information, a visible image may also be superimposed on the line pattern of the host image, and this may be for the purpose of distracting the contemplation of the viewer from the possibility of the presence of hidden information. Such a visible image may be superimposed on the line pattern of the host image by a perturbation thereof under a condition of non-interference with the high frequency spatial features of the line pattern, e.g. without changing the high frequency spatial characteristics of the pattern to such an extent that reliable decoding of the encoded hidden information is no longer possible. Where such high frequency spatial characteristics are the spatial line frequencies of the host image, this condition of non-interference requires the superposition of the visible image to make no material change to such line frequencies, i.e. so as not to materially change the line frequencies on decoding.

Any known or novel perturbation of the host image line pattern for creating the visible image may be used so long as it conforms to the above condition of non-interference. One useful method in this regard, illustrated in FIGS. 5A & 5B, which show magnified detail views of host image line patterns as described above, is the variation in the thickness of the lines in selected regions thereby creating in such regions a perception of increased darkness or lightness of the continuous shade otherwise perceived by the unaided eye. Thus, the visible image foreground is formed of those portions of the line pattern having been perturbated as described above.

Inasmuch as the high spatial frequencies of the line pattern are unaffected by the superposition of the visible image thereon in this manner, and moreover since the local structure of the line pattern is invisible to the unaided eye, it is possible to encode the hidden information in the local structure without interfering with the visible image and without the visible image imparting any visible indication or suggestion of the presence of the hidden information. In this way, the host image may be constructed so as to show any desired visible image while, at the same time, encode any desired hidden information, which may be a hidden image, without including any apparent indication or suggestion of the presence of the hidden information.

Methods of encoding hidden information, and particularly a hidden image, in a host image, and methods of decoding a host image to produce a decoded image, will now be described.

Encoding—Tiled Line Pattern

A host image may be composed of a plurality of non-overlapping constituent areas, or 'tiles', with each tile being associated with and encoding a value representing a corresponding portion of the hidden information. Where the hidden information is not an image interpretable by the human eye, but is rather a set of non-image scalar values, each tile may encode a corresponding scalar value belonging to that set. Where the hidden information is a hidden image, that image may itself be resolved into a plurality of constituent areas, or 'tiles', of the same number as the number of tiles in the host image. A scalar value may then be determined for each tile of the hidden image. When the hidden image is a greyscale image, the scalar value determined for each tile of the hidden image may represent a greyscale value (which may be an average value representative of different shades of grey within the tile), in which case each tile of the host image may encode in the spatial line frequencies thereof the greyscale value of the corresponding tile of the hidden image.

Such a host image 60 is illustrated in FIG. 6. As shown particularly in the detail view 62, the tiles of the host image may have a common and predetermined shape, which may be a circle, though it will be understood that any suitable shape may be used. The host image 60 is then composed of the collection of tiles, in this case circular tiles, arranged in some predetermined arrangement. As shown in FIGS. 4 & 6, this arrangement may be orthogonal or, as shown in FIG. 5A, hexagonal, though it will be understood that any desired arrangement may be used. It is to be understood that the detail view 62 of the host image 60 in FIG. 6 shows the tiles at a significant magnification. It is readily apparent that the tiles as they appear in an unmagnified host image 60 are significantly smaller, and their size (smallness) is limited only by the capabilities of the technology used to print the host image in a tangible document, and to capture (e.g. scan) a decodable image from the printed host image.

The spatial line frequency of each tile encodes a scalar value mapping to a corresponding portion of the hidden information, in this case a corresponding tile of the hidden image 65—a greyscale portrait of a woman's face. For this purpose, the greyscale hidden image 65 is analysed into a grid of greyscale tiles and has the same resolution as the host image 60, i.e. 50×66=3300 tiles. Each tile of the hidden image corresponds positionally to a corresponding tile in the host image 60, and the spatial line frequency of such tile is determined so as to encode the greyscale value of the corresponding tile of the hidden image 65 according to a mapping such as the circular mapping shown in FIG. 3A. In this way, a scalar value representing the greyscale shade of each one of the constituent areas of the hidden image 65 is encoded in a corresponding one of the tiles in the host image 60, and in particular in the spatial line frequencies of that tile.

It is noted that nothing in the host image 60 shown in FIG. 6 visually indicates or suggests that the hidden image 65 has been encoded therein.

As discussed above, a visible image may optionally be superimposed on a host image by altering the thickness of the lines of the line pattern falling within foreground areas of the visible image, e.g. where the visible image is darker or lighter relative to the background. Alteration of this sort is illustrated in FIG. 5A wherein the lines of the hexagonally-arranged circular tiles are selectively altered so as to produce a visible letter 'P'. FIG. 7 shows the host image 60 introduced in FIG. 6, but altered as described above so as to incorporate a starting visible image 70—in this case, a maple leaf, on a generally uniform background—by selectively altering the thickness of the lines in the tiles of the host image according to the shade of corresponding areas of the visible image. By this process, a combination image 75 including the superimposed visible image is produced from the original host image 60, and this combination image 75 continues to encode the hidden image 65 as described above. A detail view 77 of the combination image is shown illustrating the alteration of the line thicknesses.

It is noted that nothing in either the host image 60 or the combination image 75 shown in FIG. 7 as perceived by the unaided eye indicates or suggests that the hidden image 65 shown in FIG. 6 has been encoded therein. In particular, a person observing the combination image 75 having the visible image 70 superimposed therein would perceive only the maple leaf in a darker shade of grey upon a background of a lighter shade of grey, and the specifically selected spatial line frequencies of the constituent tiles do not interfere with such perception particularly because the scale of such high frequency detail is beyond unaided human acuity.

The above-described embodiment employs circular tiles, though it will be understood that any desired shape of tile may be employed so long as each such shape may be made to contain lines of a desired corresponding spatial line frequencies, so as to encode a corresponding scalar value, and so long as such shapes are sufficiently numerous such that the entire set of tiles is sufficient to encode the hidden information.

Figure 5B:
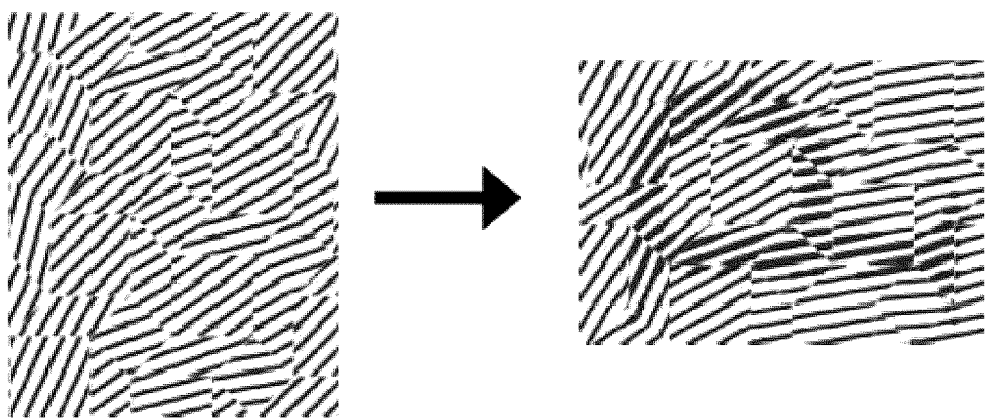
FIGS. 5A & 5B show portions of a host image comprising tiles, including circular tiles and edge-sharing polygon tiles, respectively, and the superposition of visible images thereon.
Figure 5A:
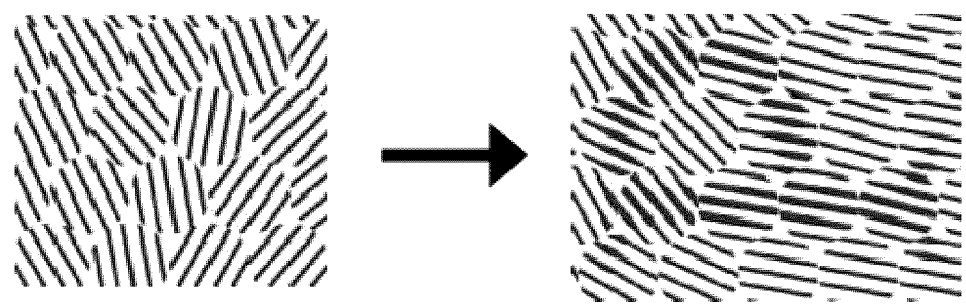

Thus, as illustrated in FIG. 5B, the tiles may comprise a plurality of polygons selected such that they may be arranged edge-to-edge without gaps, thereby creating a continuous field. The lines contained in such polygonal tiles may be selectively altered, as described above, so as to create a visible image, which in the illustration is again shown to be a letter 'P'.

FIG. 8 shows a combination image 80 composed of such polygonal tiles, the underlying host image having been altered so as to contain a visible image in the above-described manner. A detail view 82 is shown illustrating the shape and arrangement of the polygonal tiles, and the selective alteration of the constituent lines to generate a superimposed visible image which, in this case, is a logo, the detail view showing the letter 'T'. In comparison to the previous embodiment, the absence of any gaps between the tiles provides a host/combination image 80 which is smoother. The matrix of polygonal tiles, with the independently variable selection of line frequencies therein, presents to the eye a perception of texture in the host/combination image which is common and expected in such images and further conceals the presence of any hidden information. In the same manner as described above, the spatial line frequencies of the polygonal tiles of the host/combination image 80 encode a greyscale hidden image. When decoded as described below, a decoded image 85 is produced, illustrating that the encoded hidden image is again a portrait of a person's face, this time a bearded man.

In accordance with the above, therefore, and with reference to FIG. 9, a hidden image comprising a set of scalar values may be encoded in a host image comprising a set of non-overlapping constituent areas, or tiles, each tile containing a plurality of uniformly spaced, parallel lines. Encoding of the hidden image in the host image may be performed by the following method 90. The hidden image may be input (step 91) and resolved into a set of tiles (step 92). A representative scalar value may be generated for each tile of the hidden image (step 93). Corresponding spatial line frequencies may be determined from each scalar value based on a predefined mapping (step 94). The predefined mapping bijectively associates a domain of the scalar values and a curve in the spatial line frequency space of the host image, whereby each scalar value in the domain of scalar values is bijectively associated with a corresponding set of spatial line frequencies including a spatial line frequency along each spatial dimension of the host image. Each tile of the host image may then be generated based on the determined spatial line frequencies (step 95), and the host image may generated by assembling the tiles into a predefined geometrical arrangement (step 96). The host image encoding the hidden image may then be output (step 97).

It will be appreciated that the steps for generating a host image encoding a hidden image and optionally having a visible image superimposed thereon may be performed in any convenient order, and are not necessarily limited to any particular order, so long as the principles herein are observed. Thus, in another embodiment, a precursor host image may first be prepared comprising a plurality of tiles each containing a line pattern comprising a plurality of spaced, parallel line segments. In this case, the spatial line frequencies of the tiles do not yet encode the hidden image. Prior to the step of encoding the hidden image in the spatial line frequencies of the tiles, a visible image may be superimposed thereon by selectively altering the constituent line segments as described herein, e.g. by selectively altering the thickness of the selected line segments. In this connection, principles and guidelines regarding aesthetic appeal may be observed, i.e. to avoid tile boundaries having sharp or sudden changes in appearance thus rendering the final host image unsmooth or otherwise marred by visual artefacts. Having so superimposed the visible image, the contents of each tile may then be altered so as to encode the scalar values of the hidden image by altering or changing the contained line segments further, e.g. by rotating them within each tile so as to produce the desired spatial line frequencies along a predefined reference axis. Such steps may be performed automatically, i.e. by a preconfigured process performed by, e.g. processing circuitry and a memory (which may be a computer), or may be performed manually, e.g. by a user operating software configured to provide means for performing the above steps.

Encoding—Stochastic Line Pattern

A host image encoding a hidden image may comprise a generally periodic stochastic line pattern, i.e. a generally periodic pattern of line segments determined at least in part according to a randomized, or probabilistic, variable. Hidden information comprising a set of scalar values, which may be a hidden image, may then be encoded in the local representative line frequencies of the stochastic line pattern at predefined corresponding points.

While the host image and hidden image may be continuous, or analog, in a digital computational embodiment it is useful to define a discrete information reference, i.e. a matrix, which may be a grid of a predefined spatial resolution, and then define or resolve each of the host image and hidden image according to this matrix. In other words, the host image and hidden image may be analysed with reference to a common reference grid identifying respectively a constituent plurality of elements. Such elements in the host image may be considered to be picture elements, i.e. pixels. Where the hidden information encoded in the host image is a hidden image, the constituent elements of the hidden image may likewise be considered to be pixels. The scalar value of any particular pixel of the hidden image may be encoded in a corresponding pixel of the host image, and in particular in the spatial line frequencies of the stochastic line pattern in or about such pixel. While the respective pixels of the host and hidden images may be bijectively associated, any other convenient relationship may be used.

The scalar values of the hidden image may be encoded in the spatial line frequencies of the periodic stochastic line pattern of the host image in any manner known in the art. In the most general case, the scalar value associated with each hidden image pixel may be encoded in the spatial line frequencies of the entirety of the host image according to an algorithm, e.g. a weighting algorithm, associated with a corresponding pixel of the host image. Such weighting algorithm may comprise an integration of the line frequencies over the entirety of the image weighted by a generally center-weighted decay function, e.g. a Gaussian function, about the corresponding host image pixel. Alternatively, specific areas of the host image may be identified and bijectively associated with specific areas of the hidden image, resulting in the resolution of the host and hidden images into tiles similar to the embodiment described above, but wherein the contained line patterns consist not of equally-spaced parallel lines, but instead stochastic line patterns.

An exemplary method for encoding hidden information, which may be a hidden image, in a host image comprising a stochastic line pattern, is now described.

A white noise image is prepared having a predefined resolution based on the respective resolutions of the host and hidden images. For example, the resolutions of the white noise image, the hidden image, and the eventual host image may be selected to be the same. Alternative arrangements may also be used. In preparing the white noise image, each pixel of the white noise image may be calculated based on a stochastic function, i.e. a function whose value is determined at least in part 'randomly' or probabilistically. The resulting image constructing from such values will appear to be 'white noise'.

This white noise image may then be convolved with a space variable kernel h to produce an intermediate convolved image. The space variable kernel may depend on at least a first function which generally decays with distance for each point (x, y) in the spatial domain, and additionally depends on at least a second function which is periodic over the spatial domain of the kernel and incorporates the spatial line frequencies mapped to the encoded scalar value at point (x, y) in the hidden image. For example, the space variable kernel may be:

$$h(x,y,u,v)=g(x,y)\cdot\sin(u\cdot x+v\cdot y) \quad (1)$$

wherein (x, y) are coordinates in the spatial domain, (u, v)=($f_x/2\pi$, $f_y/2\pi$) are points in angular frequency space corresponding by way of the predefined mapping to the scalar value corresponding to point (x, y) of the hidden image, and g(x, y) is a generally center-weighted decay function, e.g. a Gaussian function. Thus, the space variable kernel may be calculated as the product of the value of the generally center-weighted decay function g(x, y) and the periodic function—in this case a sinusoid—may be dependent upon the angular frequencies (u, v) which are determined by the mapping of the representative scalar value of the hidden image at (x, y), e.g. according to the curve C mapped to the scalar domain q of the hidden image, as shown in FIG. 3A and discussed above. The intermediate convolved image may be computed based on the convolution of this space variable kernel with the white noise image.

The host image may then prepared by binarizing the intermediate image according to a predetermined threshold value, i.e. by assigning a value of 1 to each pixel or element have a value above the predetermined threshold value, and assigning a value of 0 to each pixel or element have a value below the predetermined threshold value.

Figure 10:
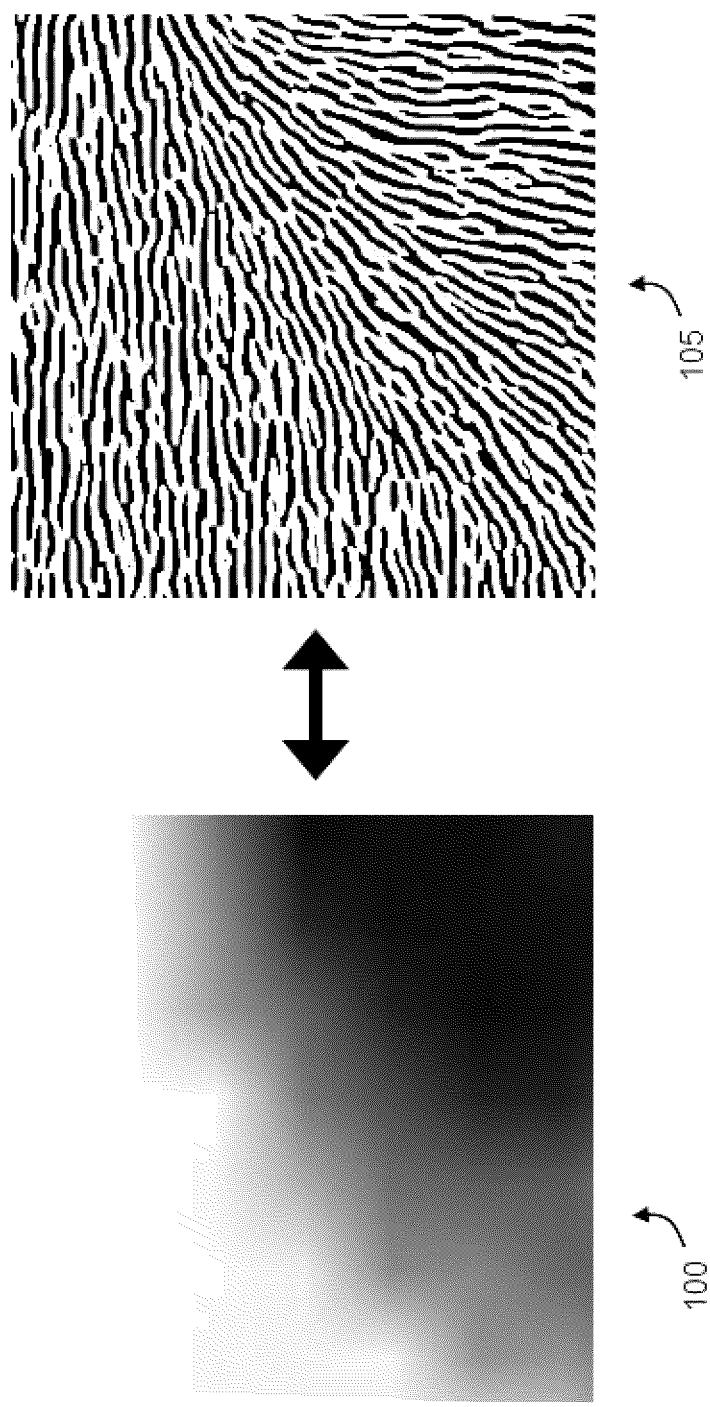
FIG. 10 shows a greyscale image and a host image comprising a stochastic line pattern encoding the greyscale image in the spatial line frequencies thereof.

Reference in this connection is made to FIG. 10 which illustrates a greyscale hidden image 100 encoded in a host image 105 composed of a stochastic line pattern in the manner described above. The local line frequencies in the host image 95 encode the greyscale values of the greyscale hidden image 100 in accordance with a mapping between the domain of the scalar values representing the greyscale shades and the host image line frequencies as shown in FIG. 3A, and in particular the circular mapping C.

As in the previous embodiments, a host image composed of a stochastic line pattern may optionally be altered so as to contain a visible image, if desired, in addition to a hidden image. The superimposed visible image is achieved by introducing perturbations in the constituent line segments of the stochastic line pattern of the host image in the regions of the host image containing the foreground of the visible image. In the present exemplary embodiment, such perturbations may consist of alterations of the thickness of the constituent line segments. FIG. 11 shows such a host image 110 wherein a visible image of a bird in flight has been added, in this case by selectively altering the thickness of the lines contained in the regions of the host image 110. FIG. 11 shows a detail view 112 of a portion of the host image 100 illustrating the stochastic line pattern composing the textured appearance of the host image 110.

As in the previous embodiments, hidden information may be encoded in the local spatial line frequencies of the stochastic line pattern. Indeed, such a hidden image is encoded in the host image 110 shown in FIG. 11 according to the method described above, and when decoded as described below, the hidden image may be extracted, i.e. a decoded image 115 produced, as shown in FIG. 11, which is revealed to be the same portrait of a woman's face as used in the first embodiment employing circular tiles.

In accordance with the above, therefore, and with reference to FIG. 12, a hidden image comprising a set of scalar values may be encoded in a host image comprising a stochastic line texture. Encoding of the hidden image in the host image may be performed by the following method 120. The hidden image may be input (step 121). A white noise image may be generated (step 122). An intermediate image may be generated by a convolution of the white noise image with a space variable kernel based on the hidden image and a predefined mapping of a domain of the scalar values of the hidden image and a domain of the spatial line frequencies of the stochastic line texture (step 123). The host image may then be generated by binarizing the intermediate convolved image according to a predefined threshold (step 124). The host image encoding the hidden image may then be output (step 125).

Decoding

A host image encoded with hidden information, which may be a hidden image, which may be a greyscale image, as described above, may be decoded by determining the local line frequencies of each point in the host image line texture, or each predefined constituent area of the host image, as the case may be, determining the scalar value corresponding to the determined line frequencies based on a predefined mapping between the domain of scalar values and the domain of spatial line frequencies, and then reassembling the scalar values so determined according to a predefined arrangement.

The process of decoding, or extracting, the hidden image, to produce a decoded image, requires the generation first of a decodable image which, in general, may be either the original or a copy of a host image encoded with a hidden image as described above. Typically, the decodable image may be a copy of the host image which had been printed on a tangible document, and the copy may be obtained by reprography from the tangible document bearing the encoded host image. This will be the case particularly where the tangible document is a secure document such as a banknote, a passport, or an identification card. In such case, the decodable image may be generated by capturing an image of the host image, printed on the tangible document, by any reprographic means known in the art capable of generating an image of sufficient resolution, i.e. so as to reliably reproduce in the decodable image the high frequency spatial details of the printed host image.

With reference to FIG. 13, where the host image is composed of a plurality of tiles, as described above, decoding may proceed by the following method 130. A decodable image is captured, as described above (step 131). Each tile of the decodable image is then localized, which may include for each tile the boundaries of that tile (step 132). The spatial line frequencies for each tile may then be determined along respective predefined reference axes (step 133). A scalar value corresponding to those spatial line frequencies may then be determined based on a predefined mapping of the respective domains of the scalar values and the spatial line frequencies (step 134). Corresponding decoded image tiles may then be generated based on the determined scalar values (step 135). The decoded image may then be generated from the decoded image tiles based on a predefined arrangement (step 136). For example, where the hidden information is a greyscale hidden image analysed into tiles, each decoded scalar value may specify a greyscale value for a corresponding tile of the hidden image, and the tiles may be arranged in a predefined geometry which may be the same as the geometrical arrangement of the tiles of the host image, e.g. orthogonally, as in FIG. 5A, or as edge-sharing polygons, as in FIG. 5B. The decoded image may then be output (step 137).

For this purpose, the process of decoding an image captured from a printed host image may include preliminary steps to enable the proper localization of the tiles and the determination of their respective boundaries. Such steps may include image orientation and/or magnification correction as in known in the art to ensure that the image to be decoded conforms to an expected, predefined reference system.

In such a case, decoding of the host image, so as to extract the hidden image encoded therein, thereby producing a decoded image, may proceed by measuring for each constituent tile of the host image the spatial line frequency of the tile along one or more predefined reference axes, which may be used to determine a corresponding scalar value, which may specify a greyscale shade, according to a predefined mapping, as described above.

In any case, for each tile of the host image, a corresponding greyscale block of specific shade of grey may be determined, and all of these greyscale blocks may be arranged in a predefined geometrical arrangement, e.g. similarly to the geometrical arrangement of the tiles in the host image, e.g. in an orthogonal grid.

In the case of a host image composed of a stochastic line pattern, however, there may be no tiles to identify, and moreover the scalar values of the hidden information may be encoded in a distributed manner, i.e. not localized to any particular discrete area of the host image.

In such a case, therefore, decoding of the encoded host image may be performed algorithmically in either the spatial domain or the frequency domain of the image. Both approaches may employ a decoding kernel or filter based at least in part on the mapping function used to encode the scalar values of the hidden image, and in part based on the distributed nature of the space variable kernel.

Figure 14B:
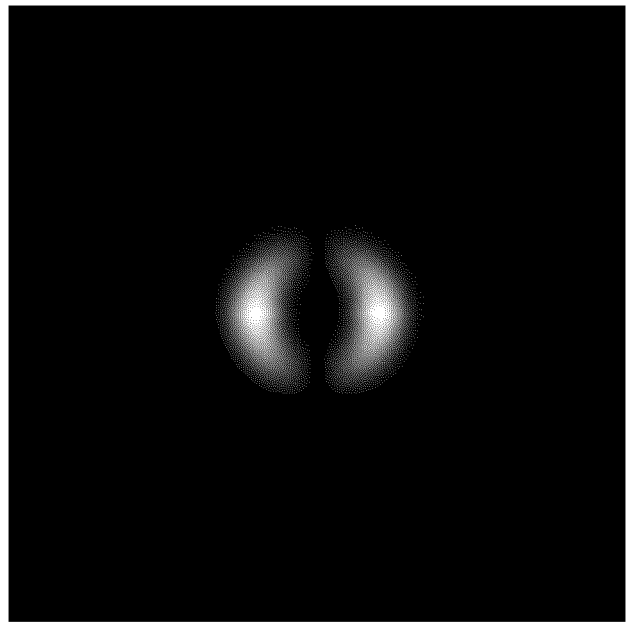
FIGS. 14A and 14B show images of decoding/filtering kernels in a frequency domain of a host image.
Figure 14A:
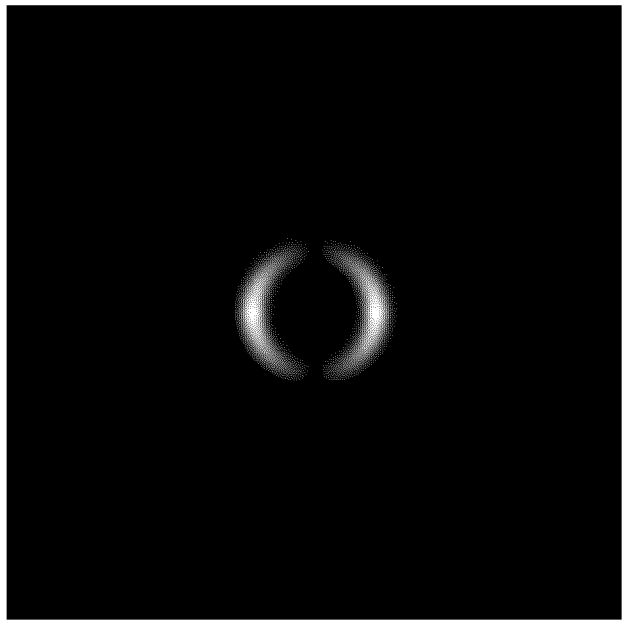

Reference in this connection is made to FIGS. 14A & 14B which illustrate frequency space representations of decoding filters for decoding host images encoded using the mapping employed above, i.e. $q \in [0,1] \rightarrow \{C, C^*\}$, where q designates the domain of the scalar values of the hidden image, specified from 0 to 1, and C (and its origin symmetric C*) designates the domain of the spatial line frequencies of the host image, in this case describing a circular segment in the frequency space of the host image. Where the host image is composed of tiles, as described above, and in particular of tiles of a given general size, the line frequencies of the host image may be more closely confined to the defined domain segment C than where the host image is composed of stochastic line segments, or is composed of tiles of smaller general size. Thus, depending on the particular characteristics of the host image, an optimal bandwidth of the decoding filter may be selected to achieve a maximal decoding fidelity. FIGS. 14A & 14B show such decoding filters have a lesser and a greater degree of such dispersion, respectively.

A host image encoded with spatial line frequencies defined along a domain C may therefore be decoded by utilizing a representation of that domain as a filter against a frequency space representation, or Fourier transform, of the encoded host image, thereby eliminating from the frequency space of the decodable image any spatial line frequencies outside of the encoding domain, while at the same time accounting for the mapping between the scalar value domain and the spatial line frequencies domain, as described above. Once the Fourier transform of a host image is filtered in this way, the resultant filtered image may be returned to the spatial domain by way of a reverse Fourier transform, thereby producing the decoded hidden image.

The above decoding process may be represented by the following algorithm:

$$i_C(x, y) \xrightarrow{FT} \hat{i}_C(f_x, f_y) \circ \hat{K}(f_x, f_y) = \hat{i}_D(f_x, f_y) \xrightarrow{FT^{-1}} i_D(x, y) \quad (2)$$

where $i_C$ is the decodable image, $\hat{i}_C$ is its Fourier transform (FT), $\hat{K}$ is the Fourier transform of the decoding/filtering kernel k, $\hat{i}_D$ is the resulting filtered image obtained by the Hadamard or entrywise product of and $\hat{i}_C$ and $\hat{K}$, and $i_D$ is the reverse Fourier transform of that filtered image, and the modulus thereof is thus the decoded image.

The decoded image so produced may be enhanced by any suitable methods known in the art. For example, for each particular point in the decoded image, a substitute value may be selected as the maximum value in a predefined neighbourhood of the decoded image about that particular point. In this way, an enhanced decoded image is generated wherein the value of each point is selected as the maximum value in a predefined neighbourhood about a corresponding point in the unenhanced decoded image. The enhanced decoded image may be prepared by raster scanning the unenhanced decoded image and selecting the corresponding maximum value for each corresponding point in the enhanced decoded image.

This is the process used to decode the host image 110 composed of a stochastic line texture shown in FIG. 11, thereby generated the decoded image 115. It will be observed that, while the present decoding method is described as being useful for decoding a host image composed of a stochastic line texture, as described above, it is equally useful for decoding a host image composed of tiles, and this is the method in fact used to decode the host image 80 to produce the decoded image 85 shown in FIG. 8, as well as, with reference to FIGS. 7 & 15, the host image 75 to produce the decoded image 155. In such case, the areas between the tiles will have no spatial line frequencies and will therefore tend to decode to a greyscale shade of black according to the predefined mapping.

Where the predefined mapping between the scalar value domain and the spatial line frequencies domain describes a circular segment in the line frequency space, and where the hidden information is a greyscale image, the scalar value domain representing a spectrum of greyscale shades from white to black, as described above, the process of decoding a host image will be tolerant to rotation of the plane of the host image relative to any reference plane of the host image, i.e. where the plane of the decodable image is rotated with respect to the plane of the original host image. As will be apparent from the mapping as particularly illustrated in FIGS. 14A & 14B, such a rotation will result in a linear translation along the spectrum of greyscale values which, at each extreme, continues smoothly without any sudden change in shade.

Figure 16:
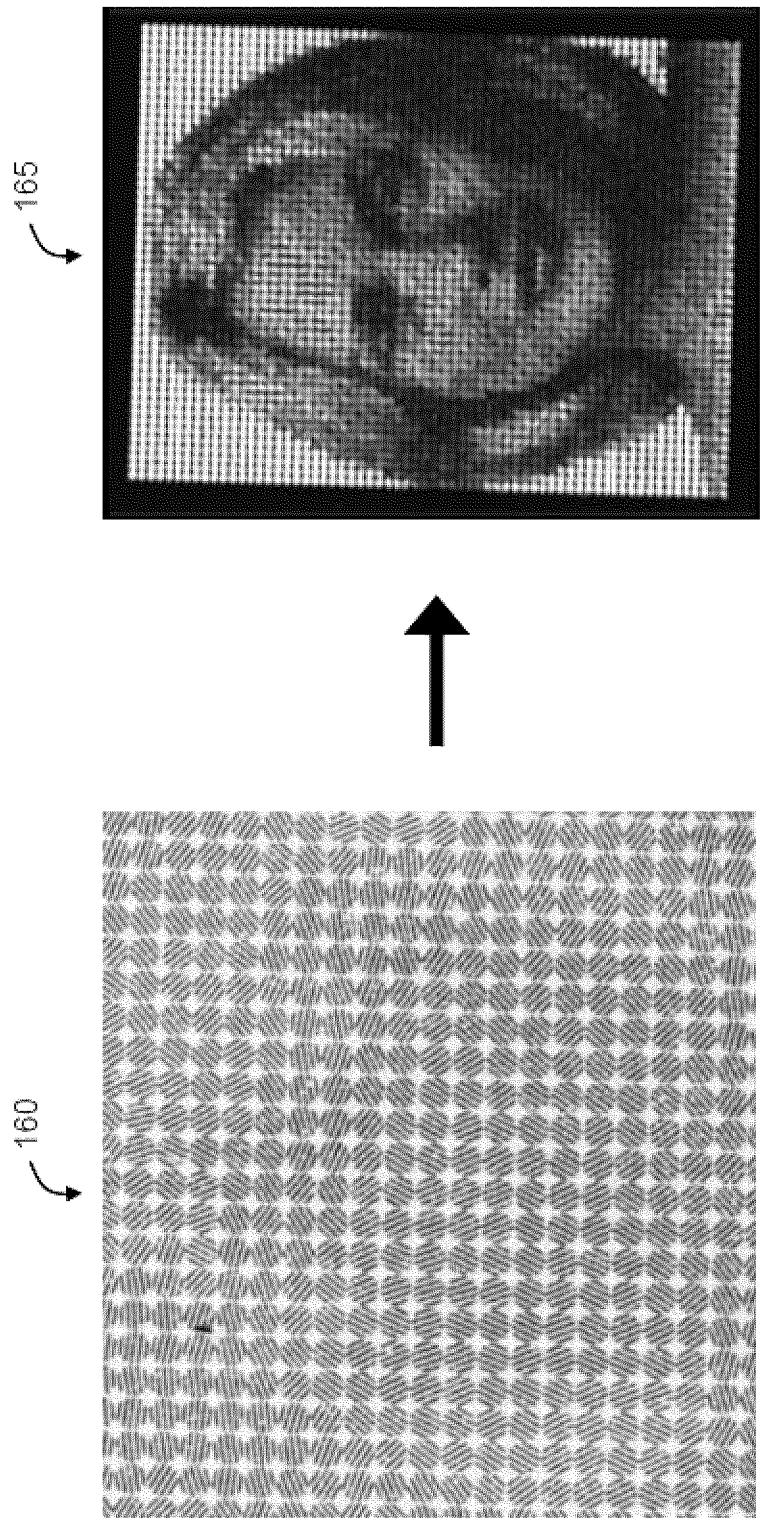
FIG. 16 shows a portion of a decodable image comprising circular tiles illustrating rotational skew of the host image with respect to a predefined reference frame, and a decoded image of a hidden image encoded therein of a greyscale portrait of a woman's face illustrating the tolerance of such decoding to the rotational skew.

As a result, the spatial line frequencies measured from a decodable image which is rotated or 'skewed' relative to the original host image will generate a decoded image having greyscale values shifted with linear dependency on the amount of rotation. Since all of the greyscale values will be similarly shifted, however, the decoded image will remain recognizable to the human eye. Reference, in this connection, is made to FIG. 16 which shows a detail view of a decodable image 160 captured from a printed version of the host image 75 shown in FIG. 15, wherein the host image 75 is printed by lithography on polycarbonate, the tiles being 250 μm in diameter, and the printed image was then scanned at a resolution of 4800 dpi. A close inspection of the detail view of the decodable image 160 will reveal that the image is rotationally skewed relative to the vertical and horizontal axes of the bounding box. Decoding of this decodable image was performed according to the method described above on the image as skewed, thereby producing the decoded image 165 shown in the FIG. 16. As is readily apparent, the decoded image is similarly skewed, but remains entirely recognizable despite the skewing of the decodable image, despite the fact that, by way of comparison with the decoded image 155 shown in FIG. 15, the greyscale shades of the constituent tiles of the decoded image 155 are shifted relative to the original hidden image 65.

The above algorithmic method, therefore, makes the process of decoding an encoded hidden image straightforward and practical, as it does not require any preliminary step of correcting the orientation of the decodable image generated by reprography, but will nevertheless produce a decoded image interpretable by the unaided human eye whether the decodable image is composed of tiles of any shape, or of stochastic line patterns. Moreover, the method is agnostic as to the use of tiles or stochastic textures, and will function to decode any host image encoded according to a common predefined domain mapping. Such a method is particularly advantageous, therefore, for embodiment in such common secure document applications as passports and banknotes and the corresponding passport readers and banknote verification devices, as the method does not require sophisticated equipment or measures to ensure suitable orientation or placement of the document for acceptable reprography.

Figure 17:
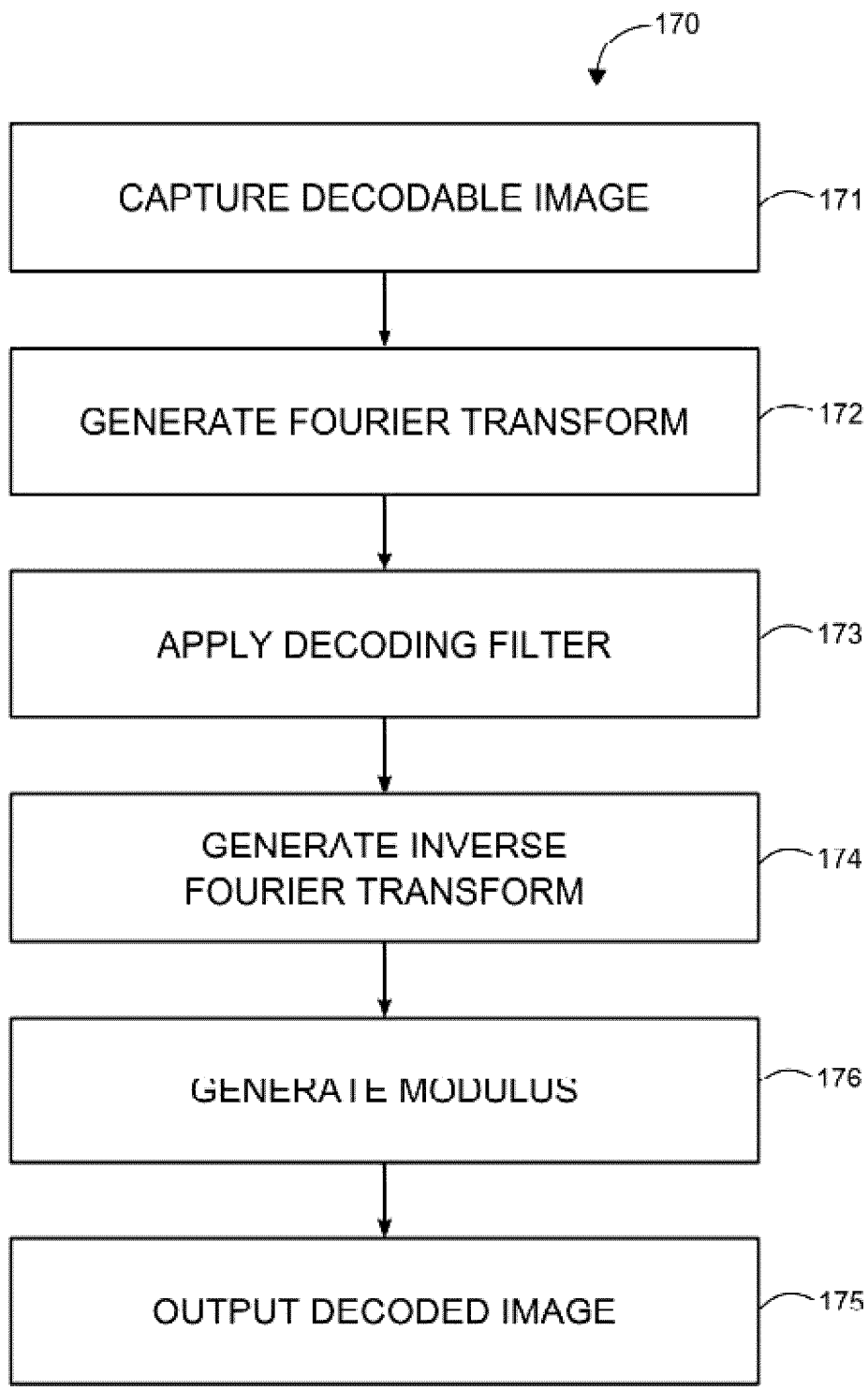
FIG. 17 shows a flowchart illustrating a method of generating a decoded image from a decodable image captured from a host image comprising a stochastic line pattern including operations in the frequency domain of the decodable image.

Thus, with reference to FIG. 17, a host image encoded with a hidden image may be decoded, i.e. a decoded image based on the hidden image may be determined therefrom, by the following method 170. A decodable image may be captured (step 171). A frequency-space representation of the decodable image may be generated by performing, e.g. a Fourier transform thereon (step 172). A decoding filter according to the above may then be applied to the frequency-space representation of the decodable image (step 173). The filtered image may then be returned to the spatial domain, e.g. by performing an inverse Fourier transform thereon (step 174), and the modulus thereof may be generated (step 176). The decoded image may then be output (step 175).

While the above decoding method is described as being performed in the frequency domain, it will be understood that the process of decoding may also be performed in the spatial domain, but in this case the operation performed on the decodable image is not a Hadamard or entrywise product, but instead a convolution with the spatial domain representation of the decoding/filter kernel:

$$i_C(x,y)*k(x,y)=i_D(x,y) \quad (3)$$

where k is the decoding/filter kernel (it being recalled that its Fourier transform $\hat{K}$ was used in the frequency space method, above). It will be understood, however, that the two approaches are mathematically equivalent, and their selection will depend upon the conveniences of the particular application.

Figure 18:
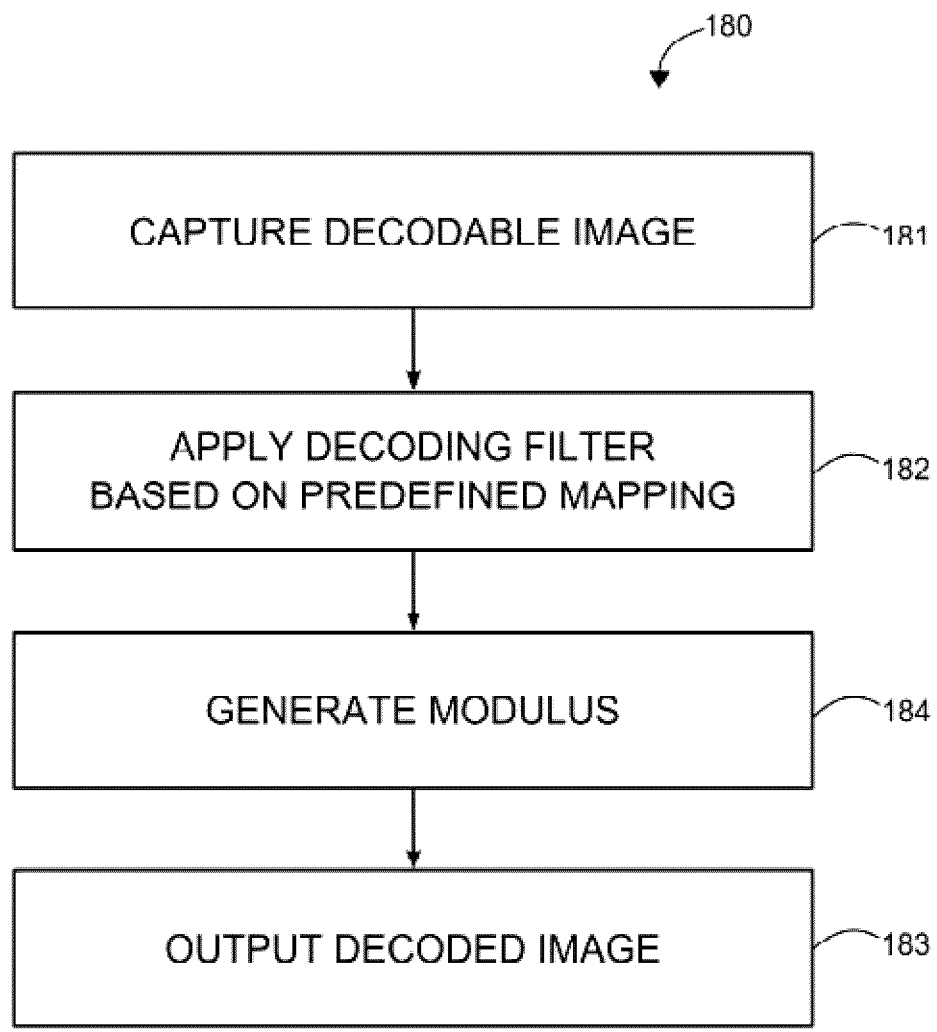
FIG. 18 shows a flowchart illustrating a method of generating a decoded image from a decodable image captured from a host image comprising a stochastic line pattern including convolution operations in the spatial domain of the decodable image.

Thus, with reference to FIG. 18, a host image encoded with a hidden image may be decoded, i.e. a decoded image based on the hidden image may be determined therefrom, by the following method 180. A decodable image may be captured (step 181). A decoding filter according to the above may then be applied to the decodable image, e.g. convolved therewith (step 182). The modulus of the convolved image may be generated (step 184), thus producing the decoded image which may then be output (step 183).

Decoding—Optical

A host image encoded with a hidden image may also be decoded by physical, non-computational means. In particular, the decoding methods described above and represented by equations (2) and (3) may be implemented by optical systems.

In either case, the decodable image $i_C$ may be reproduced on a transparent medium, wherein the line patterns of the decodable image $i_C$ modulate the transparency of the medium. This transparent medium bearing the decodable image $i_C$ may then be illuminated with collimated monochromatic coherent light at normal incidence so as to transfer linearly the transparency modulation of the decodable image $i_C$ onto the light field amplitude.

As described above, the decoding method represented by equation (2) includes an entrywise product of the frequency-domain representations $\hat{i}_C$ and $\hat{K}$ of the decodable image $i_C$ and the decoding/filtering kernel k, thereby producing a filtered image $\hat{i}_D$, which is then transformed back to the spatial domain to obtain the decoded image $i_D$. This process can be performed optically in a single step. A transparency containing the decodable image $i_C$ may be illuminated as described above and the resulting light field passed through a lens system having an aperture based on the frequency-domain representation $\hat{K}$ of the decoding/filtering kernel k. For example, the aperture may be represented substantially by the filter illustrated in FIG. 14A, wherein the aperture is either itself a transparency having a continuous range of opacity, or is instead a physical aperture, i.e. a hole having similarly-defined boundaries. An optical system comprising such a lens system will generate in one step the decoded image $i_D$. Such an optical system may include an optical 4f correlator, a discussion of which is given in the publication by Joseph Goodman, *Introduction to Fourier Optics*, 3rd edition, (Roberts & Company Publishers, 2005), paragraph 8.3, pages 234-239 ["Goodman"].

As also described above, the decoding method represented by equation (3) represents a spatial domain convolution of the decodable image $i_C$ and the decoding/filtering kernel k, thereby producing the decoded image $i_D$. This process can also be performed optically in a single step. A transparency containing the decodable image $i_C$ may be illuminated as described above and the resulting light field passed through a lens system also having an aperture based on the frequency-domain representation $\hat{K}$ of the decoding/filtering kernel k, wherein the exit pupil will give through Fourier transform the decoding/filtering kernel k as in the above-described computational convolution. Optical systems for performing such convolutions are also described in Goodman, paragraphs 6.1 & 6.2, pages 128-138.

In both instances, proper scaling of the frequency-domain representation $\hat{K}$ of the decoding/filtering kernel may be made according to the particular optical system parameters and the wavelength of the monochromatic illumination. Moreover, any aberrations of the optical system may be tailored to an acceptable level for accurate decoding.

Figure 27:
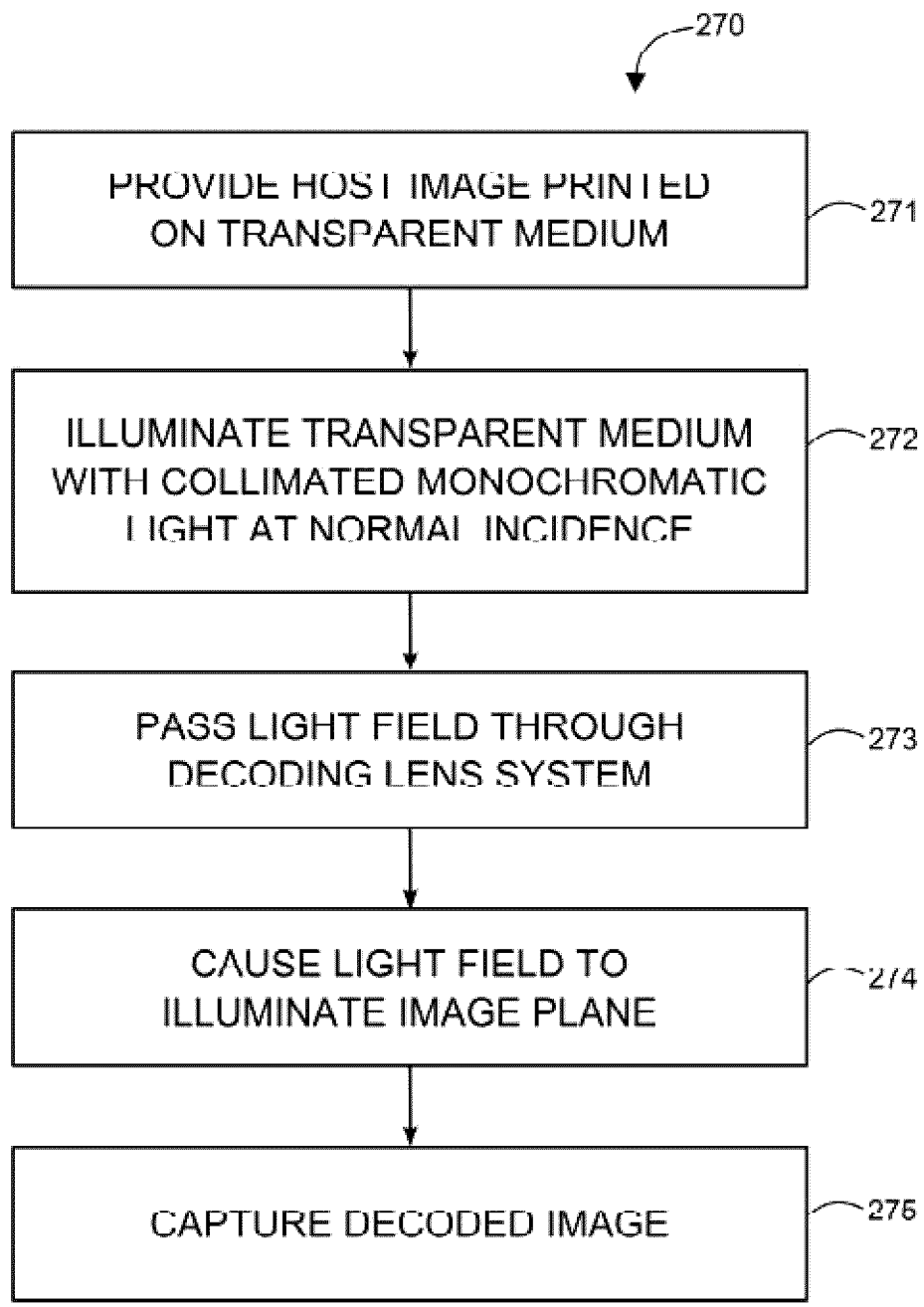
FIG. 27 shows a flowchart illustrating a method of generating a decoded image from a host image using a decoding optical system.

Thus, with reference to FIG. 27, a host image encoded with a hidden image may be optically decoded, i.e. a decoded image based on the hidden image may be determined therefrom using optical means, by the following method 270. A host image printed or otherwise reproduced on a transparent medium is provided (step 271). At least an area of the transparent medium containing the printed host image may be illuminated with collimated monochromatic coherent light at normal incidence to a plane of the transparent medium (step 272). The light field emanating from the transparent medium may then be made to pass through a lens system (step 273), having an aperture based on the frequency-domain representation $\hat{K}$ of a predefined decoding/filtering kernel k. The light field emanating from the lens system may then be made to illuminate an image plane thereby generating a decoded image (step 274). The lens system, the image plane, and a source of the collimated monochromatic coherent light may compose an optical 4f correlator. The image plane may be a screen or an optical imaging device such as a charge-coupled device sensor array, which case the decoded image may be captured from the imaging device (step 275).

Encoding—Binary Channel

The foregoing methods are effective in encoding in a host image any desired hidden information expressible as a set of scalar values, such as a hidden image, which may be reliably decoded or extracted therefrom. Such methods also enable, however, the encoding of an additional segment or channel of hidden information, or in other words an additional hidden image, composed of binary values or bits.

In the embodiments described above wherein the host image is composed of a plurality of tiles, the lines in each of the tiles may be mapped to a scalar value. With reference to a single dimension in the plane of the host image, e.g. the horizontal axis, the angular orientations of the tiles may be equated to the spatial line frequency by the relationship $v=\sin \theta/d$, where v is the spatial line frequency, d is the line spacing, and $\theta$ is their angular orientation relative to a predefined axis, e.g. the x-axis, as illustrated in FIG. 2. It will be immediately apparent to a person skilled in the art that the value of the line frequency v is insensitive to a reflection in the y-axis, i.e. that $v=\sin \theta/d=\sin(\pi-\theta)/d$. As such, any particular scalar value may be encoded in either angular orientation $\theta$ or $\pi-\theta$ providing the same line frequency v. A further segment or channel of information may therefore be encoded in this 'slope direction' of the line pattern, e.g. where $0 < \theta < \pi/2$ encodes a binary value of 0, while $\pi/2 < \theta < \pi$ encodes a binary value of 1.

In a substantially similar manner, and with reference to FIGS. 3A & 14A, where the scalar values of the hidden information are encoded in the host image in the spatial line frequencies in both spatial dimensions of the plane of the host image, and are mapped thereto as illustrated in those Figures, a similar symmetry is observed, i.e. the same scalar value corresponds to $\theta$ or $\pi-\theta$ along the curve C when described in angular notation. This ambiguity again enables the encoding in the host image of a further channel of binary information without interfering with the scalar valued hidden information.

Figure 19:
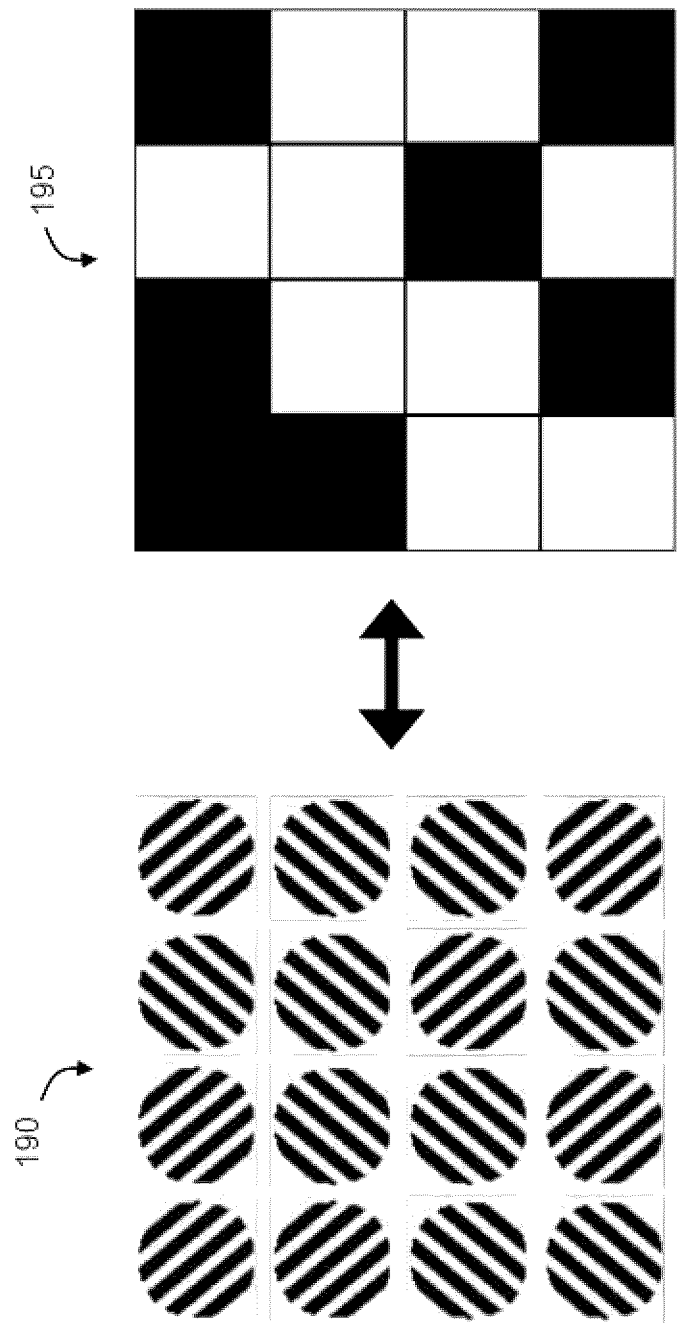
FIG. 19 shows a host image of circular tiles containing spaced parallel line segments encoding in the slope directions thereof the binary values of corresponding binary tiles.

For the sake of illustration, a example of the encoding in the 'slope direction' of circular tiles, as described above, is illustrated in FIG. 19, wherein each one of the circular tiles 190 corresponds to a respective one of the black-and-white blocks 195 representative of the binary values 0 or 1 encoded in the 'slope direction' of the circular tile.

Thus, a second, binary hidden image may be encoded in a host image by selecting the slope direction of each tile in the host image to encode a corresponding binary value of the binary hidden image. Since doing so does not interfere with the already-described encoding of a real-valued hidden image in the spatial line frequencies of the host image tiles, there is effectively provided a method of encoding simultaneously two hidden images—one real-valued image, and one binary-valued image—in a single host image, while at the same time enabling the inclusion of a visible image which interferes with neither hidden image. Such encoding of these two hidden images is illustrated in FIG. 20, wherein now a binary hidden image 210 is encoded in the very same host image 75 shown in FIG. 7 which encodes in the tile spatial line frequencies the hidden image 65. As shown in FIG. 20, by this method, three images—the greyscale hidden image 65, the maple leaf visible image 70, and the binary hidden image 210—may be encoded in a single host image 75, with both hidden images being capable of decoding with high fidelity, to generate a real-valued decoded image 155 and a binary-valued decoded image 215.

Where the host image is composed of tiles, then the encoding of the binary-valued hidden image may be accomplished simply by providing the lines of each tile with a slope direction encoding a corresponding binary value of the binary-valued hidden image according to a defined mapping, as described above. The binary-valued hidden image may be encoded in the two angular space points $(u_1, v_1)$ and $(u_2, v_2)$ which map to the same scalar value. Where the line frequencies domain describes a circular arc C as shown in FIG. 3A, then the binary values may be encoded in the angular line frequency points $(u, v)$ and $(-u, v)$, respectively.

As noted above, the binary values of the second, binary hidden image are mapped to the slope directions of the host image tiles by specifying corresponding non-overlapping ranges of the full $\pi$ angular orientation of the contained lines. Where such ranges are defined to be $0 < \theta < \pi/2$ and $\pi/2 < \theta < \pi$, as is the case with circular arc C shown in FIG. 3A, it will be apparent that there may be difficulty resolving between the two binary values at the boundaries: 0 (or $\pi$), and $\pi/2$. In other words, as the angular orientation of any tile approaches either 0 (or $\pi$), or $\pi/2$, there is a greater likelihood of error in determining the correct binary value. As such, and as demonstrated in FIG. 20, where the mapping of spatial line frequencies to greyscale values in the first real-valued hidden image 65 permits spatial line frequencies near these boundaries, e.g. where $\theta=\sim 0$ is mapped to black, and $\theta=\sim\pi/2$ is mapped to white, as shown in FIG. 3A, then there may be leakage from the first, greyscale hidden image to the second, binary hidden image in those areas of the first, greyscale hidden image which are nearest black or white. This problem is illustrated in FIG. 20, where it is shown that certain details 217 of the portrait of a woman shown in the first hidden image 65 which are nearly black or white appear as artefacts 219 in the binary-valued decoded image 215. This problem may be avoided, of course, by restricting the mapping of the spatial line frequencies to greyscale levels so as to permit only spatial line frequencies having a corresponding angular value away from the boundaries of $\theta=0$ and $\theta=\pi/2$. In this way, the difficulty of resolving the true slope direction of any particular tile is reduced or eliminated. The degree of restriction may depend, for example, on considerations of the desired fidelity of the decoded binary image versus the desired reproducible spectrum of greyscale shades in the greyscale hidden image.

When decoding the host image in order to extract the binary hidden image so encoded, it is desirable essentially to discriminate the two different slope directions according to the definitions discussed above. Such discrimination may be performed either in the spatial domain or in the frequency domain. In the spatial domain, the slope direction of any particular tile or constituent area may be determined by reference to a predefined reference axis related to the mapping function of the encoded scalar values, e.g. a horizontal axis, whereby the slope direction is determined for at least one constituent line in the tile.

Figure 21A:
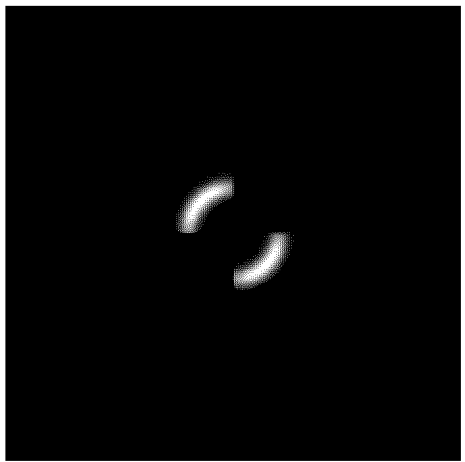
FIGS. 21A and 21B show images of slope direction filters in a frequency domain of the host image.
Figure 21B:
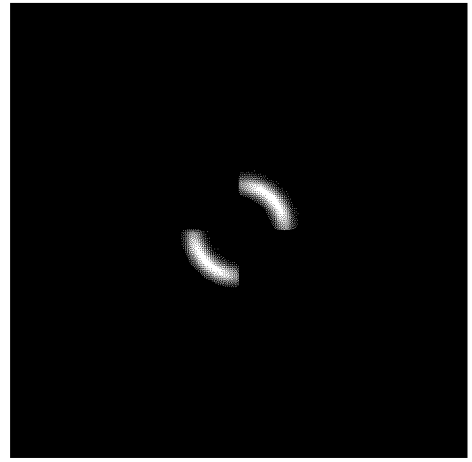

Alternatively, the binary-valued hidden image may be decoded in the frequency domain a substantially similar manner as the decoding of the real-valued hidden image described above. It will be recalled that such decoding proceeded by filtering a Fourier transform of the decodable image using a decoding filter or kernel, wherein the filter frequency-space image may be based on the predefined domain mapping, and then obtaining a decoded image from the reverse Fourier transform of the filtered image. In a similar fashion, respective frequency space filters may be used for each range of the line frequency domain, i.e. each portion of the segment C, mapped to each corresponding binary value. Reference in this regard is made to FIGS. 21A & 21B which illustrate two such filters: a first, in FIG. 21A, which selects a first slope direction, and a second in FIG. 21B, which selects a second slope direction. Decoding of a host image having encoded therein a binary-valued hidden image in the slope direction of its constituent tiles may then be performed by: determining a Fourier transform of the host image to produce a frequency space representation thereof; filtering that frequency space representation using the above-described filter corresponding to a selected one of the binary values (e.g. to the binary value '1'); and generating the binary-value decoded image by generating the reverse Fourier transform of the filtered image. It is noted that the decoded binary-valued decoded image 215 in FIG. 20 was produced according to this method.

Further Encoding/Decoding Options

As a further alternative, the ambiguity of any mapping of scalar values and line frequencies may be used to encode in the host image not one set of real-valued hidden information, or hidden image, but two sets. In this case, each tile may contain not one set of lines, but two, overlapping each other. Each set of lines may be restricted to a separate, non-overlapping range of angular orientations. For example, where these two ranges include $0 < \theta < \pi/2$ and $\pi/2 < \theta < \pi$, then the lines encoding the scalar values of the first hidden information may be restricted to an angular orientation of $0 < \theta < \pi/2$, whereas the lines encoding the scalar values of the second hidden information are restricted to an angular orientation of $\pi/2<\theta<\pi$. In such a case, decoding of the first real-valued hidden image may be performed using a first one of the frequency-space filters described above, selecting a first range of angular orientations, and the second real-valued hidden image may be performed using the second one of the frequency-space filters.

As in the other embodiments described above, the encoding of two hidden images in this way does not rely upon any average luminosity or optical density of the tiles or line pattern more generally. As in the other embodiments, therefore, such optical density may be used to include a visible image in the host image by the methods described above including, for example, altering the thickness of the constituent lines.

Such a visible image, and in particular the luminosity or optical density of the constituent tiles of the host image, may be used as a further channel of information for cooperation with the hidden images. As such, a single host image may encode at least three channels of real-valued information.

Figure 22:
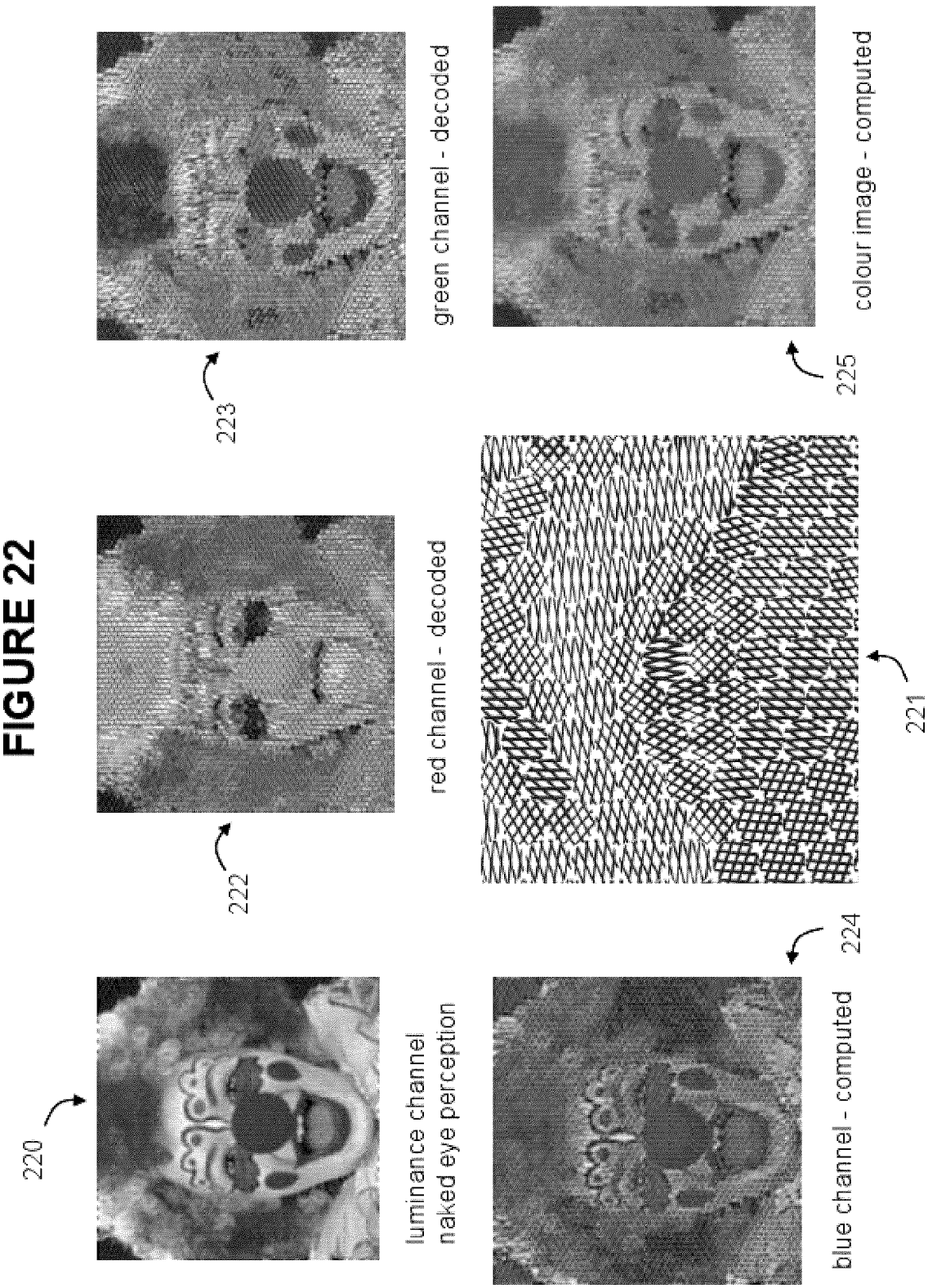
FIG. 22 shows a detail of a host image comprising circular tiles encoding in two separate line patterns and in the selective thickness of the lines pattern in the tiles the red, green, and luminance component images of an RGB image of a clown's face, as well as the blue component image calculated therefrom, and the RGB colour image calculated therefrom.

For example, and as illustrated in FIG. 22, a host image 220 (detail view 221 also shown) may be constructed so as to have a superimposed visible image, in this case a greyscale visible image of a clown's face. Two real-valued hidden images (corresponding decoded images 222, 223 shown), encoded as described above in the spatial line frequencies of overlapping line patterns in the constituent, hexagonally-arranged circular tiles of the host image (as particularly shown in the detail view 220), may be used to encode the red and green channels of an RGB image of the very same clown's face. The luminosity or optical density of the tiles—i.e. the brightness and darkness of the tiles in the greyscale visible image 221—may be used to represent the luminance channel of the RGB image for each tile. Using these three channels of information—the luminosity, red, and green channels—the remaining blue channel 224 may be calculated according to methods known in the art. The full RGB image may therefore be encoded in the host image 220 and decoded by determining, for the constituent tiles, the red and green channels from the two hidden images 222, 223, and the luminance from the visible image superimposed on the host image 220, which, along with the calculated blue channel 224, may be used to generate the RGB decoded image 225 shown in FIG. 22. (While of course not apparent in a greyscale reproduction of the decoded image, the clown's hair on top, and his nose, lips, and cheeks are red; the make-up under his eyes is teal; and the remainder of the image contains a variety of difficult colours.)

In a further embodiment, and for the purpose of providing an additional degree of security in a secure document bearing a host image encoding a hidden image as described, the mapping of the scalar value and spatial line frequency domains used to encode a hidden image in any particular host image may be selected based on an otherwise independent aspect or detail, or key feature, of the secure document containing that host image. For example, for a given class or collection of secure documents, the mapping used to encode each hidden image may be determined based on a key feature of all or at least some of the secure documents in the class or collection. Where the secure documents are banknotes, for example, the key feature may be the denomination of the banknote, with e.g. using respectively different mappings for 5 unit notes, 10 unit notes, 20 unit notes, and so forth. At the time of production of the secure document, and thus the encoding of the hidden image in the host image, the key feature may either be read from a memory or other data storage means wherein it is stored in association with the secure document, and is intended to be reproduced in the secure document, or alternatively it may be read or measured from the secure document when already printed thereon and when the host image has yet to be printed or produced on the secure document. At the time of decoding the host image, any suitable and desirable means may be employed to read or measure from the secure document the key feature wherein the identity of the key feature is determined based on such reading or measurement, and the correct mapping may be selected based on such determination. A plurality of mappings may be defined in a table in association with corresponding key features, or the correct mapping may be determined algorithmically based on a quantity derived from the key feature.

Preventing Counterfeiting

It will be appreciated by persons of ordinary skill in the art that host images constructed as described above are effective for encoding hidden information in a number of different ways, including as according to the principles of steganography: by enabling the inclusion of a visible image without interfering with the encoded hidden information, in such a way as to neither indicate nor suggest the presence of the hidden information. It will also be appreciated by such persons, however, that the host images so produced may be subject to precise reproduction, depending on the reproduction technology employed, despite any ignorance on the part of the person copying of the presence of the hidden information.

In order to combat accurate reproduction of such host images, therefore, the present inventors have also invented methods for use in combination with the steganographic methods described above.

In order to thwart accurate reproduction of a host image encoding hidden information, the limitations of known reprographic technology may be exploited. It is known, for example, that the scanning resolution of many scanning devices is anisotropic, and there is therefore a tendency for the scanning process to introduce artefacts in any features sensitive to such anisotropy. In the above-described embodiments, where scalar values are encoded in spatial line frequencies corresponding to different angular orientations, the full range of angular orientations will not be imaged with uniform fidelity. Consequently, the ability to decode certain angular orientations, i.e. spatial line frequencies will tend to be more prone to error than other angular orientations. With this knowledge, the mapped frequency domain C may be selected so as to generate predominantly predefined angular orientations which for a particularly targeting scanning technology will tend to introduce imaging errors which will result later in decoding artefacts.

Further methods now described for thwarting reproduction of the host images described herein concern printed versions of host images as described above, and concern the use of different printing media, or inks.

It is known in the art that a particular ink may be selected to as to have desired properties of reflectivity, i.e. that the ink, when applied to a selected substrate, will have a predetermined reflectivity when illuminated with light of a selected optical spectrum. In this way, inks may be selected so as to have reflectivity sufficient to be imageable in selected ranges of the illumination spectrum, but not otherwise.

Figure 23:
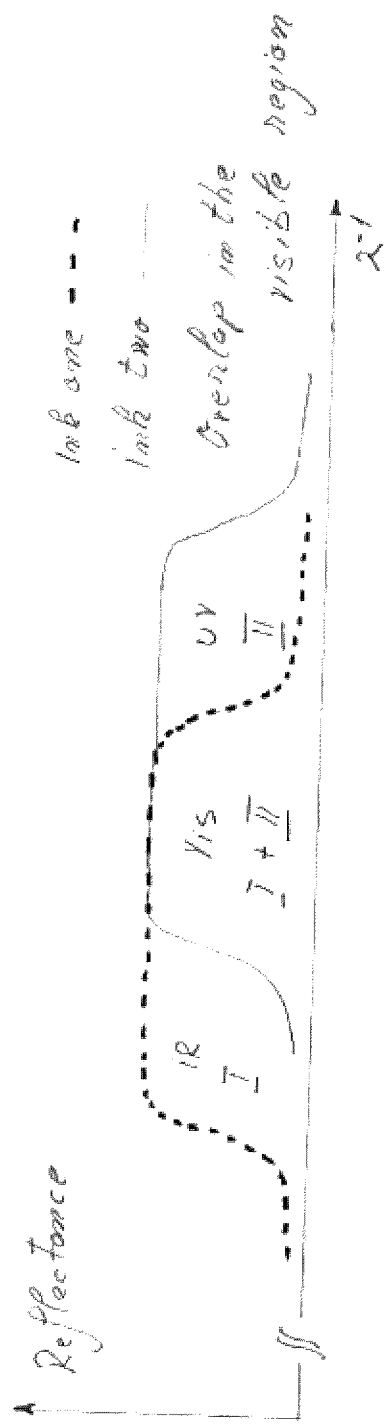
FIG. 23 shows a schematic representation of first and second partly overlapping spectral illumination bands wherein first and second inks are respectively imageable.

For example, and as illustrated in FIG. 23, a first ink may be selected so as to be imageable when illuminated with either infrared or visible light, but not when illuminated with ultraviolet light. Similarly, a second ink may be selected so as to be imageable when illuminated with either visible or ultraviolet light, but not when illuminated with infrared light. If the first ink is used to print a first image on a substrate, and the second ink is used to print a second image on the substrate together with the first image (e.g. overlapping the first image), then neither image will be separately imageable when illuminated with visible light, as they will overlap and interfere; instead, the first and second images may be imaged separately when illuminated with only infrared or ultraviolet light, respectively.

This approach may be used to thwart copying of a host image encoding one or more hidden images as described herein. A combination image may be formed of first and second component images printed on a substrate so as to overlap at least in part, wherein the first and second component images are printed using first and second inks, respectively, wherein the first component image may be imageable under first and second selected illumination conditions, and the second component image may be imageable under second and third lighting conditions. Thus, the first and second component images may be imageable separately under the first and third illumination conditions, respectively, but under the second illumination conditions both component images are imageable and contribute to the combination image.

Figure 24:
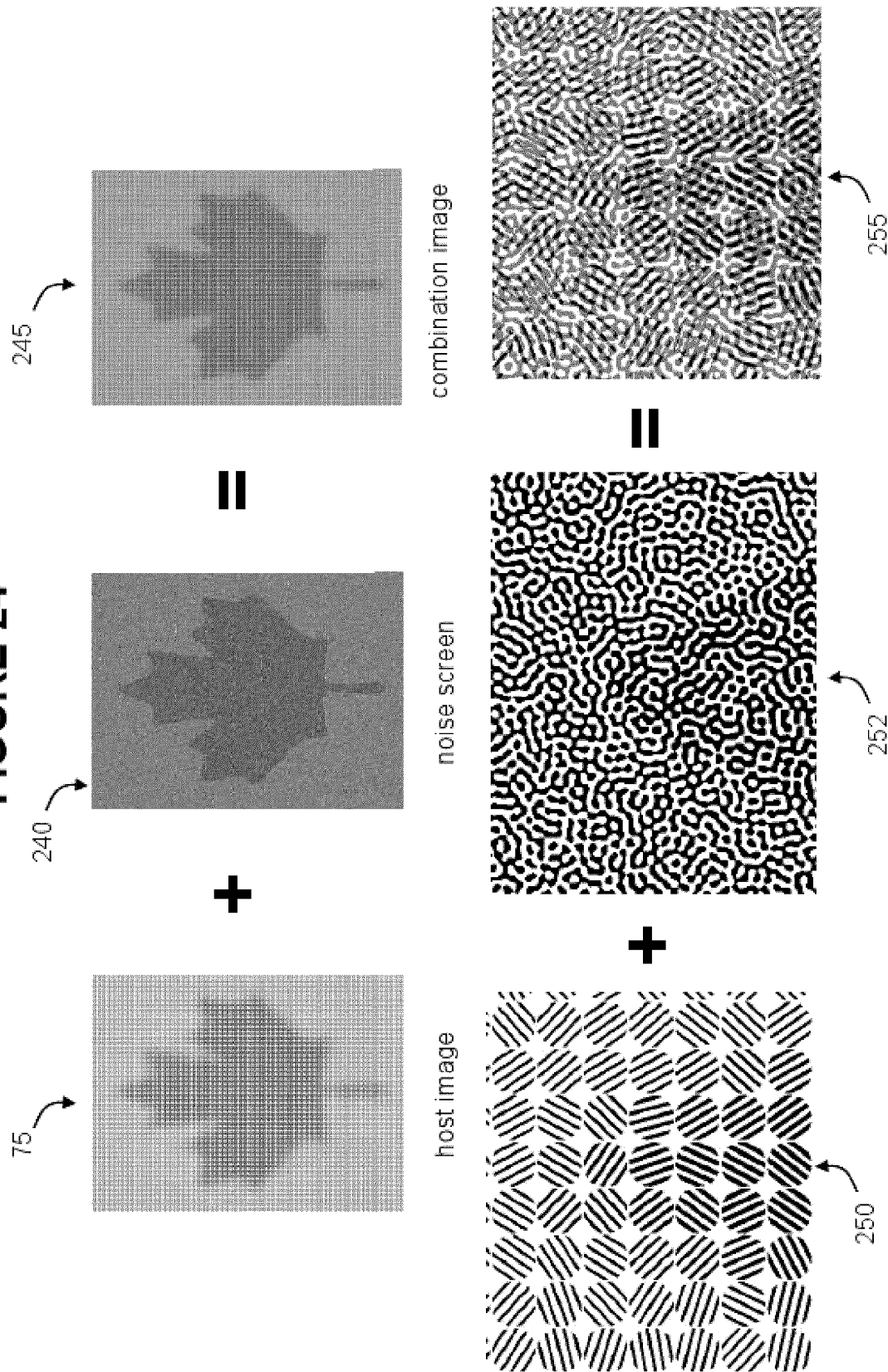
FIG. 24 shows a host image comprising circular tiles encoding a hidden image and containing a visible image of a maple, as well as a detail view thereof, and additionally a noise screen image comprising high frequency graphical elements and containing a visible image of the maple leaf, as well as a detail view thereof, and additionally a superposition of the host image and the noise screen image, as well as a detail view thereof.
Figure 25:
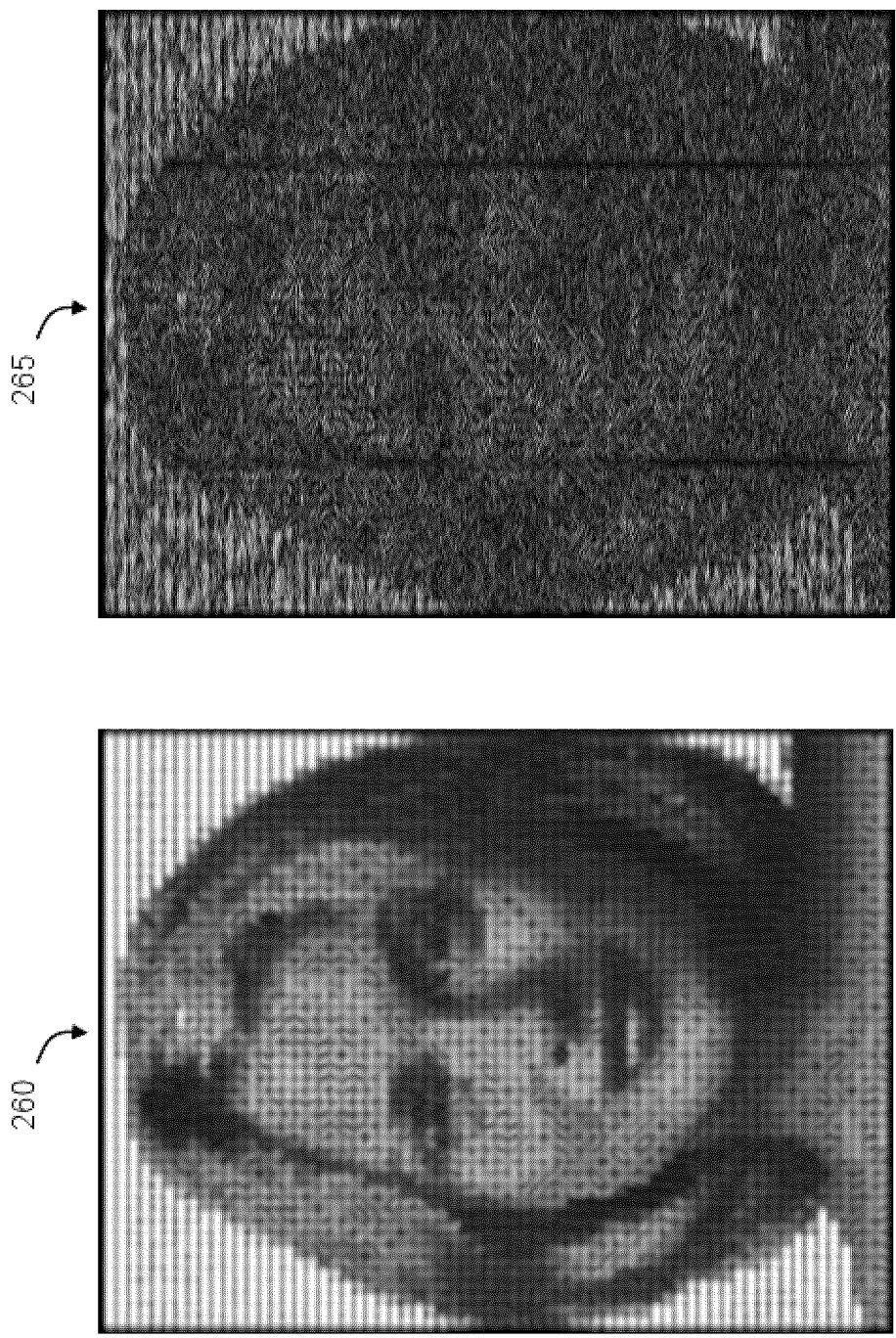
FIG. 25 shows a decoded images generated from the host image of FIG. 24 with and without the noise screen.

An exemplary embodiment according to this approach is illustrated in FIGS. 24 & 25. The first component image may be constructed as a host image 75 as described above, i.e. so as to encode one or more hidden images. A detail view 250 of the host image 75 is shown in FIG. 24. The second component image 240 may be constructed as a noise screen. A detail view 252 of the noise screen 240 is shown in FIG. 24. The host image 75 may be printed using a first ink imageable under first and second illumination conditions, e.g. infrared and visible illumination, and the noise screen 240 may be printed using a second ink imageable under the second illumination condition and a third illumination condition, e.g. visible and UV illumination. The first and second component images are printed on the same substrate in overlapping fashion. A detail view 255 of the combination image showing the overlapping patterns of the host image 75 and the noise screen 240 is shown in FIG. 24. As with the host image 75, the thickness of the texture elements of the noise screen 240 may be selectively altered so as to produce a visible image, which in FIG. 24 is shown to be the very same maple leaf as superimposed on the host image 75. When the two component images are printed in overlapping fashion, therefore, the visible images reinforce to produce in the combination image 245 a visible image of the maple leaf.

With a combination image 245 so produced, under the first illumination conditions, e.g. infrared illumination, the host image 75 may be separately imageable, and the captured image decodable according to the methods described above, to generate a decoded image 260 as shown in FIG. 25. Under the second lighting conditions, e.g. visible illumination, however, both the host image 75 and the noise screen 240 contribute to the captured image, and the details of the noise screen 240 interfere with the line textures of the host image 75, thereby rendering proper imaging and decoding of the host image 75 difficult or impossible. In this respect, the noise screen 240 may be particularly generated so as to have a frequency space representation which overlaps at least partly, substantially, or entirely, with the frequency space representation of the host image 75 or, more particularly, with the mapped frequency domain C as described above. An attempted decoding of a captured image so produced is shown in FIG. 25, and it is apparent that in this decoded image 265 the hidden image encoded in the host image has been substantially obscured.

Figure 26:
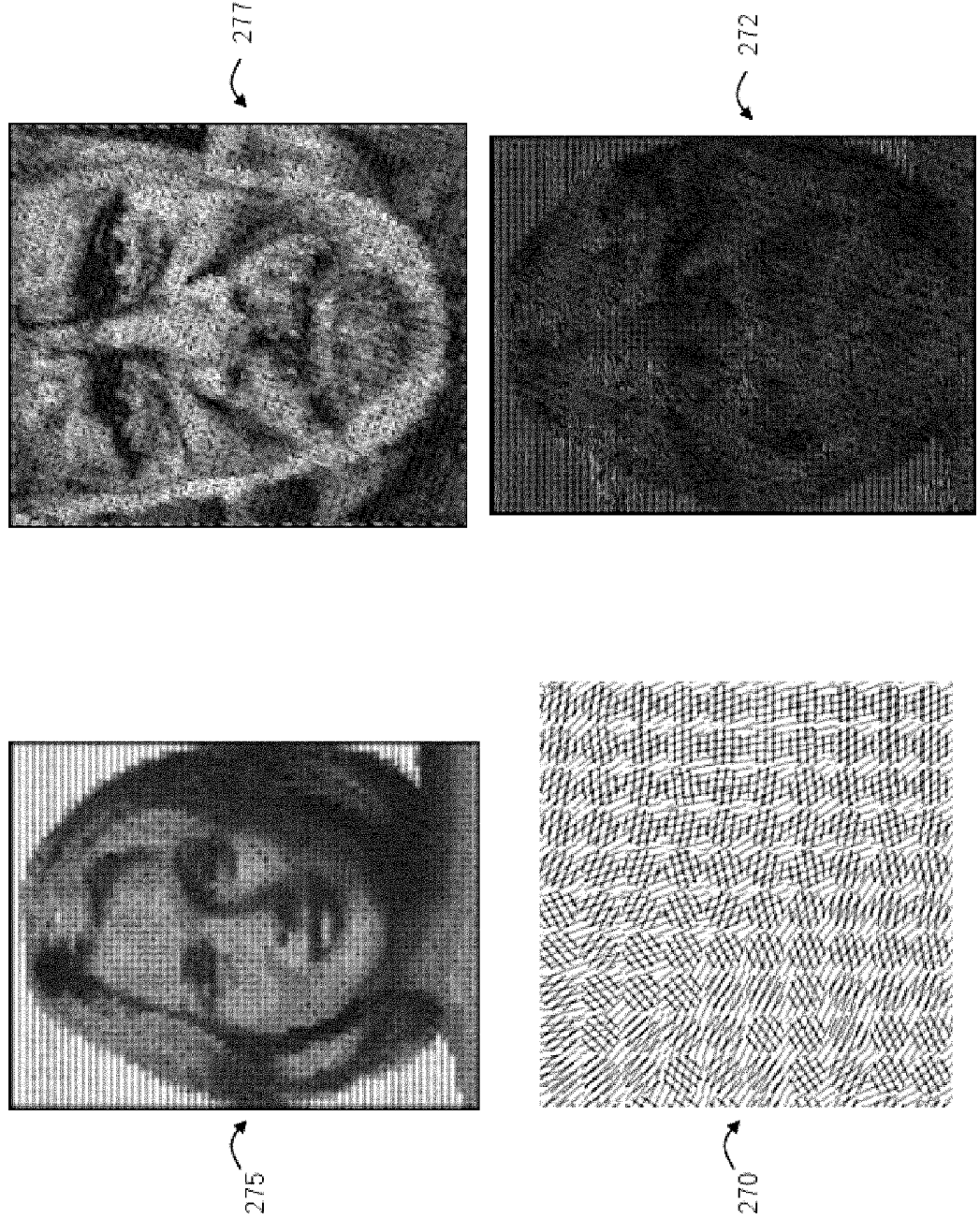
FIG. 26 shows a first decoded image generated separately from a first host image comprising circular tiles encoding a greyscale hidden image of a woman's portrait, and superimposed thereon a second decoded image generated separately from a second host image comprising edge-sharing polygonal tiles encoding a greyscale hidden image of a man's portrait, along with a detail view thereof, and a third decoded image generated from the superposition of the first host image and the second host image.

As a further alternative, and as shown in FIG. 26, each of the two component images may be constructed as a separate host image described herein, i.e. so as to encode one or more hidden images. The combination image—a detail view 270 of which is shown—when viewed or imaged under the second illumination conditions will contain both host images which will interfere thereby producing a substantially incomprehensible decoded image 272, and therefore neither component host image may be decoded reliably under the second illumination conditions. When illuminated under different the first or third illumination conditions, however, each of the first and second host images may be separately imaged and therefore decoded, as shown by the respective first and second decoded images 275, 277.

It will be understood by persons of ordinary skill in the art that a combination image according to the foregoing may be formed of more than two component images so long at least one of the component images is independently imageable under selected illumination conditions. For example, three component images may be used where each is printed using a different ink, such that each component image may be independently imageable in a corresponding range of the illumination spectrum.

The above-described techniques employing multiple inks having different spectral properties may also be employed in a single host image constructed as described above but wherein a first portion of the line texture of the host image is printed with a first ink, and a second portion of the line texture is printed with a second ink (and, optionally, a third portion in a third ink, and so forth), wherein the lines of the first portion interleave with the lines of the second portion (and so forth). In this case, the entire host image would be reliably decodable only when each of the first and second inks (and third ink, etc., as the case may be) is imageable under given illumination conditions. Thus, if the illumination conditions do not provide sufficient reflectance in all of the constituent subsets, the host image cannot be reliably decoded.

In all of the above embodiments, it will be appreciated that the combination images composed of multiple component images each imageable under different illumination conditions may be configured so as to be difficult to reproduce reliably in such a way as to retain accurately the hidden information encoded therein. In particular, in the embodiments described above employing two inks, the first imageable under IR and visible light, and the second imageable under visible and UV light, any attempted reprography using only visible-spectrum illumination, wherein both host component images are imageable and therefore overlap, would generate a captured image in which isolation of one of the two component images is nearly impossible, thereby rendering similarly difficult or impossible the decoding of the hidden information encoded in either image.

Any of the above embodiments may be combined as desired to further strengthen the security of the underlying document. For example, first and second inks may be selected so as to be imageable in the infrared and visible regions; a third ink may be selected which is imageable only in the ultraviolet region, and the first ink may be further selected to also be imageable in the ultraviolet region, thereby overlapping the third ink in this regard. Thus, the first and second inks overlap in the infrared and visible regions, but not the ultraviolet, while the first and third inks overlap in the ultraviolet region, but not the infrared or visible. The first and third inks may then be used to print interleaving subsets of lines forming a host image encoding hidden information, as described above, while the second ink may be used to print a stochastic jamming pattern, i.e. a pattern which interferes with the imaging and decoding of the host image subset printed using the first ink. Further combinations may be developed using the same principles.

The principles employed above may be further extended by employing physical characteristics of printing media other than spectral reflectance. For example, the printing inks of different component images may be selected so as to have similar photoluminescence properties in a short period following illumination, but also so as to have substantially different intensity decay times. Immediately following illumination both inks may have substantially similar luminescence intensity, and the component images may both contribute to a combination image in the manner described above. Once the intensity of one of these component images has decayed substantially compared to that of the other component image, the latter may become independently imageable. Thus, this technique may be employed, for example, by producing a combination image including a first component image comprising a host image as described above, and a second component image comprising a stochastic jamming pattern as described above, wherein a first ink used to print the first component image has a first photoluminescence decay characteristic, and a second ink used to print the second component image has a second photoluminescence decay characteristic, such that, following illumination of the combination image with a selected illumination spectrum, both component images are imageable within a first predetermined period following illumination, while only the first component image is imageable in a second predetermined period thereafter, thus enabling the capture of the first component image separately and the decoding of the hidden image encoded therein. The above teaching will also lead a skilled technician to other useful combinations.

Secure Document Validation

The above-described methods of encoding hidden information in a host image may be used to provide a method for validating the authenticity of a secure document. The hidden information may comprise authentication content. Authentication of a candidate document may then be performed by decoding a decodable host image printed on the candidate document, as described above, in order to extract any hidden information encoded therein, and then comparing the extracted hidden information to expected information, e.g. the authentication content. Where the extracted hidden information matches the expected authentication content in accordance with predefined standards, the secure document may be designated as authentic, and may be designated as inauthentic otherwise.

For example, the host image may encode hidden information comprising certain predefined authentication data which may be a string of alphanumeric characters, or a string a binary bits. A candidate document bearing the host image may be authenticated by decoding the hidden information and comparing any data contained therein with the expected authentication data, e.g. to determine a match to an encoded string of alphanumeric characters or binary bits.

Alternatively, where the hidden information is a hidden image, authentication of a secure document bearing the encoded host image may be performed manually, e.g. by a human operator, by a visual comparison. For example, where the secure document is a passport, the host image may encode in the hidden image a copy of the passport holder's photograph also included in the passport as a separate visible image, e.g. a photograph. Authentication of the passport may then be performed by the human operator by decoding the hidden image using a passport reader provided with the means for decoding the host image and displaying the decoded hidden image on a display, and visually comparing the decoded hidden image to the passport holder's photograph or alternatively to the passport holder himself, i.e. his face. A similar process may be used to authenticate a secure document which is a banknote. In this case, the host image may encode a hidden image visually recognizable by a human operator as an expected image, either by comparison to another visible image in the banknote, or from some other source. Authentication may then be performed by decoding the hidden image and comparing it to the expected authentication image, wherever it may be.

Further authentication methods may be developed based on the foregoing examples and the remaining teaching herein.

Physical Embodiments

The above methods may be embodied in and performed by any suitable technologies known in the art.

Figure 28:
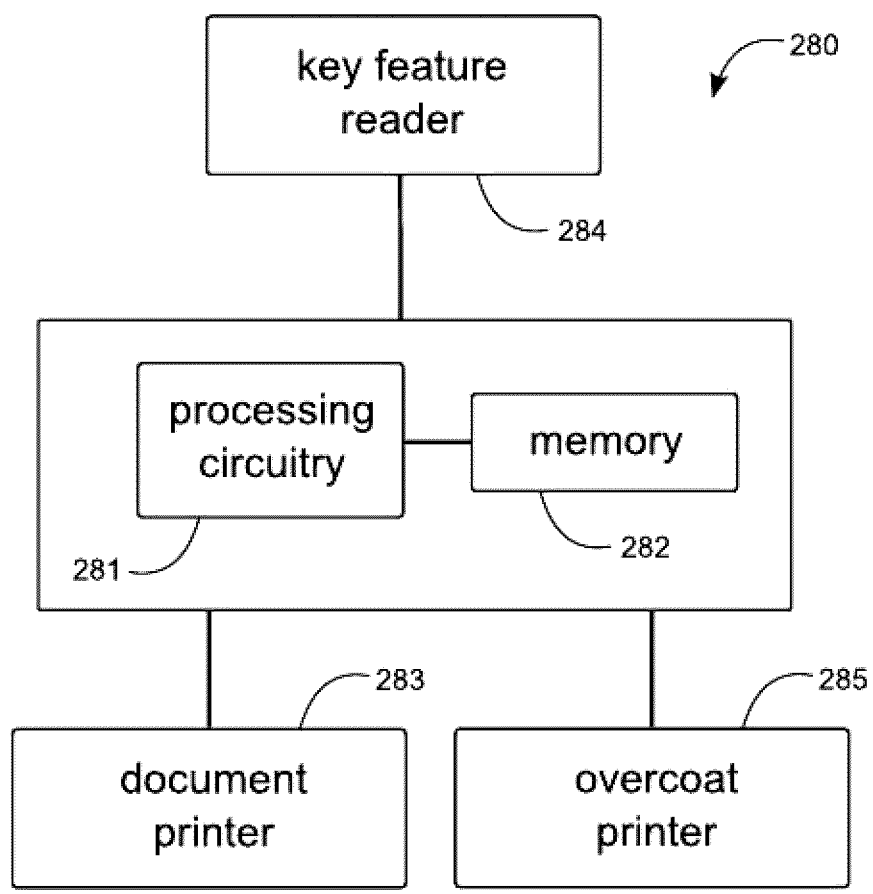
FIG. 28 shows a schematic representation of an apparatus for making a secure document including a host image encoding a hidden image in the host image spatial frequencies of a line pattern thereof.

In particular, and with reference to FIG. 28, the above-described methods of generating a host image encoding a hidden image, and optionally superimposing a visible image, may be performed by an apparatus 280 comprising processing circuitry 281 operatively connected to a memory 282. The memory may contain any hidden image, any visible image, any host image, any mappings, and any other parameters for performing the above-described methods. The instructions necessary to perform the methods may be encoded in the processing circuitry, or may be stored in the memory for execution by the processing circuitry. The processing circuitry and memory may compose a general purpose computer having a processor and a memory, the memory storing instructions operable by the processor to perform the methods, and a data store storing the data representative of the respective images and parameters (e.g. the scalar value—spatial line frequency domain mapping, the binarizing threshold value, as described above). Alternatively, the methods may be performed by a special-purpose device having processing circuitry configured to perform the method on the images stored in any suitable data storage.

A generated host image may be printed on a substrate or otherwise produced in physical form by any means known in the art. For example, a host image described above may be printed on a substrate to produce all or part of a document, which may be a secure document, by any printing means known in the art including lithography, intaglio, laser marking, screen printing, and dye thermal transfer. For such purpose, the apparatus may further comprise a document printer 283 operatively connected to the processing circuitry and optionally also the memory, and the document printer may optionally include a main content printer for printing the secure document content apart from the host image, and a separate, host image printer for printing the host image.

Where the mapping used to encode the hidden image in the host image is determined or selected based on a key feature of the document, the memory of the apparatus may further store the key feature of the secure document, and a table of the key features and corresponding mappings. Where the key feature is read or measured from the secure document in order to select the corresponding mapping prior to printing the host image, the apparatus may further comprise or interface a key feature reader 284 for such purpose.

Additionally, the apparatus may optionally include or co-operate with a finish or overcoat printer 285 for applying any desired overcoat, finish, or other matter to the document.

Figure 29:
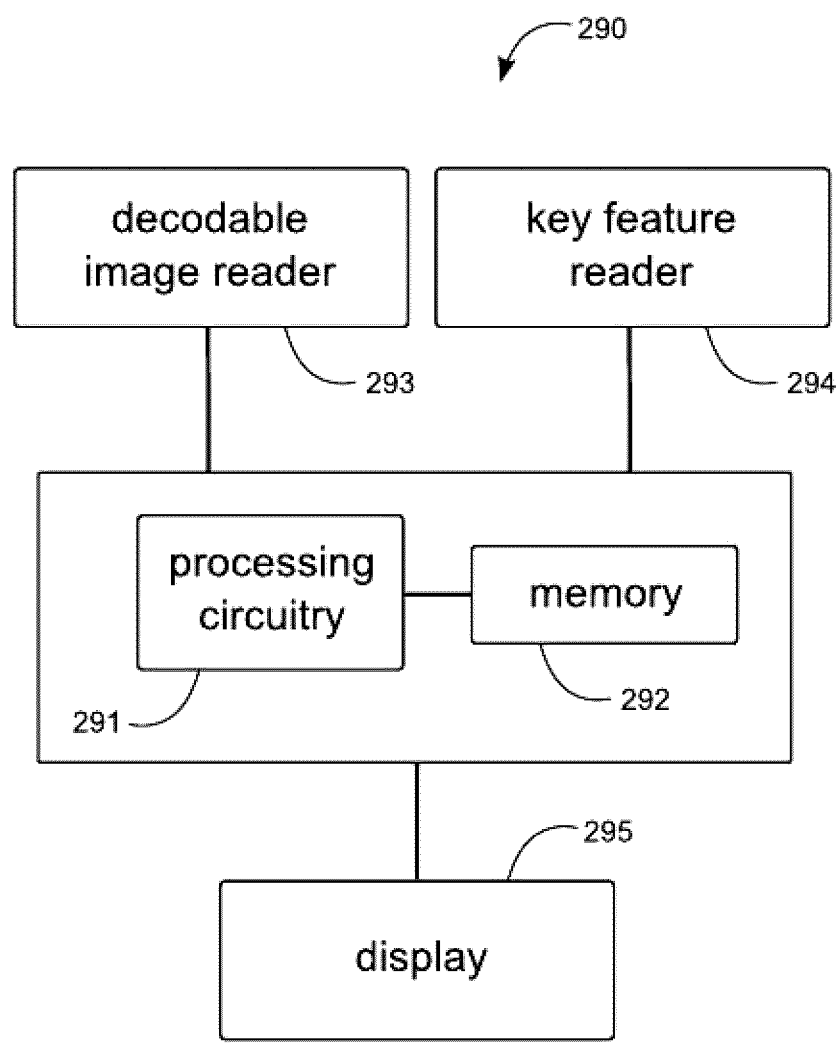
FIG. 29 shows a schematic representation of an apparatus for generating a decoded image from a decodable image based on a host image encoding a hidden image in the host image spatial frequencies of a line pattern thereof.

With reference to FIG. 29, the above-described methods of generating a decoded image from a host image may be performed by an apparatus 290 comprising processing circuitry 291 operatively connected to a memory 292. The memory may contain any decodable image, any decoded image, any host image, any hidden image, and any other parameters for performing the above-described methods. The instructions necessary to perform the methods may be encoded in the processing circuitry, or may be stored in the memory for execution by the processing circuitry. The processing circuitry and memory may compose a general purpose computer having a processor and a memory, the memory storing instructions operable by the processor to perform the methods, and a data store storing the data representative of the respective images and parameters. Alternatively, the methods may be performed by a special-purpose device having processing circuitry configured to perform the method on the images stored in any suitable data storage.

For the purposes of capturing a decodable image from a secure document, the apparatus may further comprise or interface to a decodable image reader 293 operatively connected to the processing circuitry and optionally also the memory. The decodable image reader 293 may comprise any convenient device configured with means for capturing the decodable image from the secure document. Where the hidden image is encoded in the host image based on a mapping selected based on a key feature of the secure document, as described above, the apparatus may further comprise or interface to a key feature reader 294 which may optionally be identical or comprise an aspect of the decodable image reader 293. The decodable image reader 293 may be a peripheral of a general purpose computer, or a special purpose device, possessing some imaging means. For example, the decodable image reader 293 may be a scanner or a camera. Similarly, the decodable image reader 293 may be a portable device, such as a cellular phone, a smartphone (e.g. an Apple™ iPhone™ or Research in Motion™ Blackberry), a personal data assistant (PDA), a tablet device (e.g. an Apple™ iPad™ or Research in Motion™ Playbook™), a personal media device (e.g. an Apple™ IPod™). The decodable imager reader 293 may comprise a digital camera or some other imaging means of these devices operable to capture the decodable image from the document. The key feature reader 294 may likewise comprise any of the above. The apparatus 290 may further comprise or interfaces with a display 295 for displaying or otherwise outputting the decoded image.

Figure 30:
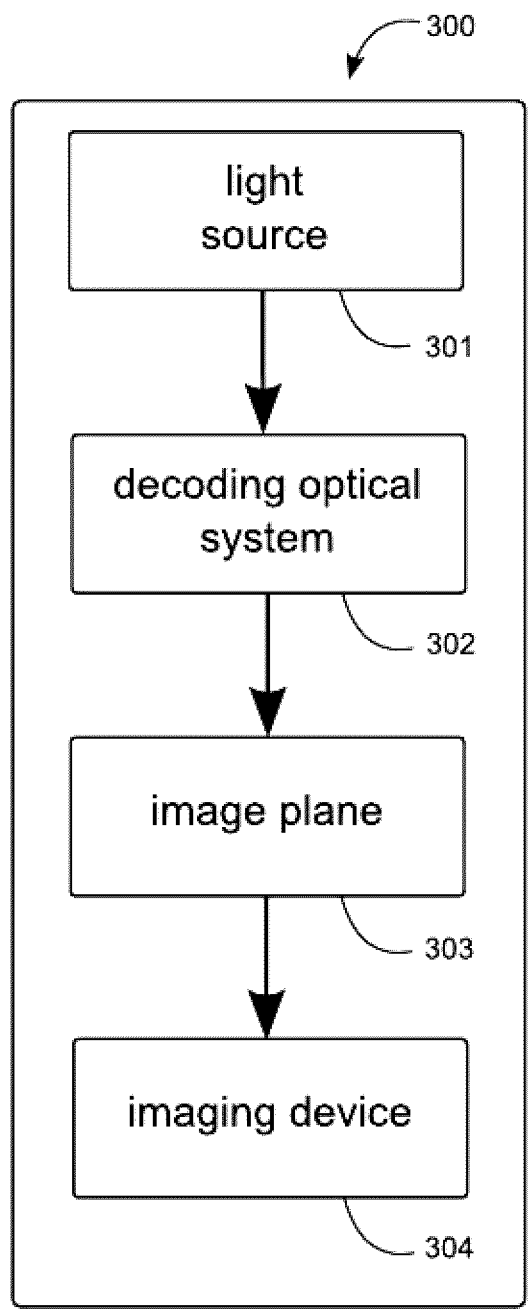
FIG. 30 shows a schematic representation of an apparatus for generating a decoded image from a host image incorporated in a transparent medium and encoding a hidden image in the host image spatial frequencies of a line pattern thereof using a decoding optical system.

With reference to FIG. 30, the above-described optical methods of generating a decoded image from a host image may be performed by apparatus 300 comprising a source of collimated monochromatic coherent light 301, a decoding optical system 302, and an image plane 303. The decoding optical system 302 may, as described above, include an aperture based on the frequency-domain representation $\hat{K}$ of a predefined decoding/filtering kernel k, including wherein the optical system 302 is an optical 4f correlator. The image plane 303 may be a screen (e.g. wherein an operator may view the decoded image directly) or may be an optical imaging device such as a charge-coupled device sensor array, in which case the decoded image may be captured by an imaging device 304.

Although various exemplary embodiments of the invention have been disclosed, it should be apparent to those skilled in the art that various changes and modifications can be made which will achieve some of the advantages of the invention without departing from the true scope of the invention.

Embodiments of the invention may be implemented in any conventional computer programming language. For example, preferred embodiments may be implemented in a procedural programming language (e.g. "C") or an object oriented language (e.g. "C++"). Alternative embodiments of the invention may be implemented as pre-programmed hardware elements, other related components, or as a combination of hardware and software components.

Embodiments can be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server over the network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

It is to be appreciated that the section headings appearing hereinbefore do not limit the scope of the invention as described but are merely intended to organize the description for the sake of clarity.

With the foregoing exemplary embodiments having been disclosed, it will be apparent to those skilled in the art that various changes and modifications can be made to appropriately suit the needs and objectives of another application and still achieve the advantages of the invention; all such changes and modifications are intended to fall within the scope of the invention as defined by the claims that follow.

What is claimed is:

1. A method of making a secure document including a host image encoding a hidden image, the method comprising:
    inputting the hidden image;
    determining a set of representative scalar values based on the hidden image;
    generating a set of host image spatial frequencies corresponding to the set of representative scalar values, wherein each host image spatial frequency is generated based on the corresponding representative scalar value and a predefined mapping of a domain of the set of representative scalar values and a domain of the host image spatial frequencies;

generating the host image based on the set of host image spatial frequencies, the host image comprising a line pattern characterized by the set of host image spatial frequencies; and incorporating the host image in the secure document, wherein determining the set of representative scalar values comprises:

resolving the hidden image into a set of hidden image tiles corresponding to the set of representative scalar values, each hidden image tile containing a corresponding subset of the hidden image; and for each hidden image tile, determining the corresponding representative scalar value based on the corresponding subset of the hidden image contained in the hidden image tile;

generating the host image comprises:

generating a set of host image tiles corresponding to the set of representative scalar values, each host image tile containing a corresponding subset of the line pattern characterized by the host image spatial frequency corresponding to the representative scalar value corresponding to the host image tile; and assembling the host image tiles according to a predefined arrangement.

2. The method according to claim 1, wherein the hidden image is a greyscale image, and wherein, for each hidden image tile, determining the corresponding representative scalar value based on the corresponding subset of the hidden image contained in the hidden image tile comprises determining a representative greyscale value of the subset of the greyscale image contained in the hidden image tile.

3. The method according to claim 1, wherein the set of host image tiles comprises a plurality of circles or a plurality of edge-sharing polygons.

4. The method according to claim 1, wherein, for each host image tile, the subset of the line pattern contained in the host image tile comprises a set of spaced parallel line segments, wherein a spatial frequency of the set of line segments is characterized by the corresponding host image spatial frequency.

5. The method according to claim 1, wherein the line pattern comprises a plurality of line segments, the method further comprising:

incorporating a visible image into the host image, wherein a thickness of each of selected ones of the line segments is selectively increased or decreased.

6. The method according to claim 1, wherein:

determining the set of representative scalar values comprises determining each representative scalar value at a corresponding point in the hidden image;

generating the host image comprises:

generating a white noise image, wherein, for each of a plurality of points in the white noise image, a value of the white noise image is generated at least in part based on a probabilistic variable;

generating an intermediate image based on a convolution of the white noise image with a space variable kernel, wherein, for each specified point in a plane of the intermediate image, a value of the space variable kernel is based on:

a decay function characterized in that a value of the decay function decreases with distance from the specified point; and a periodic function characterized in that a value of the periodic function varies periodically with distance from the specified point and is dependent upon the host image spatial frequency corresponding to the representative scalar value determined for a corresponding point in the hidden image; and binarizing the intermediate function according to a predefined threshold value, thereby generating the host image.

7. The method according to claim 6, wherein the hidden image is a greyscale image, and wherein each representative scalar value is determined based on a greyscale value of the greyscale image at the corresponding point in the greyscale image.

8. The method according to claim 6, wherein the space variable kernel is determined based on formula (1):

$$h(x,y,u,v)=g(x,y)\cdot\sin(u\cdot x+v\cdot y)$$

wherein (x, y) is the specified point in the plane of the intermediate image and the corresponding point in the hidden image, (u, v) are points in an angular frequency plane determined by the host image spatial frequency corresponding to the representative scalar value determined for the corresponding point (x, y) in the hidden image, h(x,y,u,v) is the space variable kernel, and g(x, y) is the decay function, wherein the decay function is a Gaussian function.

9. The method according to claim 6 further comprising:

incorporating a visible image into the host image, wherein a thickness of selected graphical elements of the host image are selectively increased or decreased.

10. The method according to claim 1, wherein the hidden image is a first hidden image, the set of representative scalar values is a set of first representative scalar values, the set of host image spatial frequencies is a set of first host image spatial frequencies, and the predefined mapping is a first predefined mapping, the method further comprising:

inputting a second hidden image;

determining a set of second representative scalar values based on the second hidden image;

generating a set of second host image spatial frequencies corresponding to the set of second representative scalar values, wherein each second host image spatial frequency is generated based on the corresponding second representative scalar value and a second predefined mapping of a domain of the set of second representative scalar values and a domain of the set of second host image spatial frequencies, wherein the domain of the set of first host image spatial frequencies and the domain of the set of second host image spatial frequencies are non-overlapping; and generating the host image based further on the set of second host image spatial frequencies.

11. The method according to claim 10, wherein:

the host image comprises a first host image and a second host image, the first host image comprising a first subset of the line pattern, the second host image comprising a second subset of the line pattern;

the first subset of the line pattern is characterized by the set of first host image spatial line frequencies;

the second subset of the line pattern is characterized by the set of second host image spatial line frequencies; and incorporating the host image in the secure document comprises:

printing the first host image on a substrate of the secure document using a first ink imageable under a first illumination spectrum, wherein the first ink is also imageable under a second illumination spectrum non-overlapping with the first illumination spectrum; and printing the second host image on the substrate of the secure document using a second ink imageable under the second illumination spectrum, wherein the second ink is also imageable under a third illumination spectrum non-overlapping with the first and second illumination spectrums;

wherein the first host image is imageable separately from the second host image under only the first illumination spectrum, and the second host image is imageable separately from the first host image under only the third illumination spectrum.

12. The method according to claim 1, wherein the hidden image is a first hidden image, the domain of the host image spatial frequencies comprises non-overlapping first and second sub-domains, and the predefined mapping maps the domain of the set of representative scalar values redundantly to the first and second sub-domains, the method further comprising:

inputting a second hidden image;

determining a set of representative binary values based on the second hidden image, the set of representative binary values corresponding to the set of representative scalar values;

wherein each host image spatial frequency is generated based on the predefined mapping to only the first sub-domain or only the second sub-domain based on the corresponding representative binary value.

13. The method according to claim 12, wherein:

a first sub-set of the line pattern is generated based on a first subset of the host image spatial frequencies based on the predefined mapping to the first sub-domain;

a second sub-set of the line pattern is generated based on a second subset of the host image spatial frequencies based on the predefined mapping to the second sub-domain;

each host image spatial frequency comprises a spatial frequency vector comprising a spatial frequency direction;

the spatial frequency direction of each of the host image spatial frequencies based on the predefined mapping to the first sub-domain is within a first domain of spatial frequency directions;

the spatial frequency direction of each of the host image spatial frequencies based on the predefined mapping to the second sub-domain is within a second domain of spatial frequency directions; and the first domain of spatial frequency directions is non-overlapping with the second domain of spatial frequency directions.

14. The method according to claim 1, wherein:

incorporating the host image in the secure document comprises printing the host image on a substrate of the secure document using a first ink imageable under a first illumination spectrum, wherein the first ink is also imageable under a second illumination spectrum non-overlapping with the first illumination spectrum;

the method further comprising:

printing a noise screen on the substrate of the secure document in overlapping relation to the host image using a second ink imageable under the second illumination spectrum;

wherein the host image is imageable separately from the noise screen under the first illumination spectrum, and is imageable only in combination with the noise screen under the second illumination spectrum.

15. The method according to claim 14, wherein graphical elements of the noise screen are characterized by spatial frequencies falling within the domain of the host image spatial frequencies.

16. The method according to claim 1, wherein:

the line pattern comprises a plurality of line segments including a first set of line segments and a second set of line segments; and incorporating the host image in the secure document comprises:

printing the first set of line segments on a substrate of the secure document using a first ink imageable under a first illumination spectrum, wherein the first ink is also imageable under a second illumination spectrum non-overlapping with the first illumination spectrum; and printing the second set of line segments on the substrate of the secure document using a second ink, wherein the second ink is imageable under only the second illumination spectrum, or wherein the second ink is imageable under only the second illumination spectrum and a third illumination spectrum non-overlapping with the first and second illumination spectrums;

whereby the first and second sets of line segments of the line pattern of the host image are imageable together under only the second illumination spectrum.

17. The method according to claim 16, wherein the first set of line segments are interleaved with the second set of line segments.

18. An apparatus for making a secure document including a host image encoding a hidden image, the apparatus comprising processing circuitry and a memory configured to perform the method according to claim 1.

19. A method of generating a decoded image from a host image comprising a periodic line pattern encoding a hidden image, the method comprising:

inputting the host image;

generating a frequency domain representation of a decoding filter, wherein a value of the decoding filter at any specified point in the frequency domain is based on a predefined mapping of a domain of a set of representative scalar values of the decoded image and a domain of host image spatial frequencies of the host image;

generating a frequency domain representation of the host image, generating the set of representative scalar values based on the host image spatial frequencies of the host image and the decoding filter;

generating the decoded image based on the set of representative scalar values; and outputting the decoded image, wherein generating the set of representative scalar values comprises:

generating a filtered image based on an entrywise product of the frequency domain representation of the host image and the frequency domain representation of the decoding filter; and generating a spatial domain representation of the filtered image, the spatial domain representation comprising the set of representative scalar values.

20. The method according to claim 19, wherein:

the frequency domain representation of the host image comprises a Fourier transform of the host image; and the spatial domain representation of the filtered image comprises an inverse Fourier transform of the filtered image.

21. The method according to claim 19 further comprising: displaying the decoded image.

22. A method of generating a decoded image from a host image comprising a periodic line pattern encoding a hidden image, the method comprising:

inputting the host image;

generating a frequency domain representation of a decoding filter, wherein a value of the decoding filter at any specified point in the frequency domain is based on a predefined mapping of a domain of a set of representative scalar values of the decoded image and a domain of host image spatial frequencies of the host image;

generating a spatial domain representation of the decoding filter corresponding to the frequency domain representation of the decoding filter, generating the set of representative scalar values based on the host image spatial frequencies of the host image and the decoding filter;

generating the decoded image based on the set of representative scalar values; and outputting the decoded image, and and wherein generating the set of representative scalar values comprises:

generating a filtered image based on a convolution of a spatial domain representation of the host image and the spatial domain representation of the decoding filter;

wherein the filtered image comprises the set of representative scalar values.

23. An apparatus for generating a decoded image from a host image comprising a periodic line pattern encoding a hidden image, the apparatus comprising processing circuitry and a memory configured to perform the method according to claim 20.

24. The apparatus according to claim 23 further comprising an imager for capturing the host image from a secure document.

25. The apparatus according to claim 23 further comprising a display for displaying the decoded image.

26. A method of generating a decoded image from a host image comprising a periodic line pattern encoding a hidden image, the method comprising:

providing the host image on a transparent medium, wherein the periodic line pattern produces a transparency modulation in the transparent medium;

illuminating the transparent medium with collimated monochromatic coherent light at normal incidence so as to transfer linearly the transparency modulation onto a light field amplitude of the light, thereby producing a modified light field;

passing the modified light field through a lens system comprising an aperture based on a frequency domain representation of a decoding kernel based on a predefined mapping of a domain of representative scalar values of the hidden image and a domain of host image spatial frequencies, thereby producing a further modified light field;

illuminating an image plane with the further modified light field, thereby generating the decoded image.

27. The method according to claim 26 using an optical 4f correlator comprising the lens system, the image plane, and a source of the collimated monochromatic coherent light.

* * * * *